US010311364B2

(12) United States Patent
Beechuk et al.

(10) Patent No.: US 10,311,364 B2
(45) Date of Patent: Jun. 4, 2019

(54) PREDICTIVE INTELLIGENCE FOR SERVICE AND SUPPORT

(71) Applicant: salesforce.com, inc., San Francisco, CA (US)

(72) Inventors: Scott D. Beechuk, San Francisco, CA (US); Michael Ramsey, Foster City, CA (US); Arvind Krishnan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 240 days.

(21) Appl. No.: 14/548,188

(22) Filed: Nov. 19, 2014

(65) Prior Publication Data
US 2015/0142720 A1 May 21, 2015

Related U.S. Application Data

(60) Provisional application No. 61/906,346, filed on Nov. 19, 2013.

(51) Int. Cl.
*G06N 5/04* (2006.01)
(52) U.S. Cl.
CPC .................. *G06N 5/048* (2013.01)
(58) Field of Classification Search
CPC . G06N 5/02; G06N 5/04; G06N 5/048; G06F 15/18
See application file for complete search history.

(56) References Cited

U.S. PATENT DOCUMENTS

| 5,418,950 A | 5/1995 | Li et al. |
| 5,577,188 A | 11/1996 | Zhu |
| 5,608,872 A | 3/1997 | Schwartz et al. |
| 5,649,104 A | 7/1997 | Carleton et al. |
| 5,701,400 A | 12/1997 | Amado |

(Continued)

FOREIGN PATENT DOCUMENTS

WO    WO 9321587 A2 * 10/1993 ........... G06N 99/005

OTHER PUBLICATIONS

Final Office Action for U.S. Appl. No. 14/014,204, dated Feb. 29, 2016, 44 pgs.

(Continued)

*Primary Examiner* — Eric Nilsson
(74) *Attorney, Agent, or Firm* — Elliott, Ostrander & Preston, P.C.

(57) ABSTRACT

Embodiments regard predictive intelligence for service and support. An embodiment of a method includes receiving at an interface for a database system data entered in one or more data fields regarding service of a first case for a first client, the data being received from the first client or from an agent entering data regarding the first case; automatically comparing by the database system the data for the first case with data for other cases stored in a data store of the database system; identifying by the database system one or more similar cases based on the comparison of data; automatically generating by a predictive intelligence algorithm applied by the database system one or more predictive actions for the first case based on the identified one or more similar cases; and transmitting data regarding the one or more predictive actions to the first client or agent.

21 Claims, 17 Drawing Sheets

(56) References Cited

U.S. PATENT DOCUMENTS

| | | | |
|---|---|---|---|
| 5,715,374 A * | 2/1998 | Heckerman | G06N 5/025 |
| | | | 700/246 |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,383 B1 | 4/2003 | Martin | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,629,095 B1 | 9/2003 | Wagstaff et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,254,641 B2 * | 8/2007 | Broughton | H04M 3/523 |
| | | | 379/266.01 |
| 7,289,976 B2 | 10/2007 | Kihneman et al. | |
| 7,340,411 B2 | 3/2008 | Cook | |
| 7,472,114 B1 | 12/2008 | Rowney et al. | |
| 7,620,655 B2 | 11/2009 | Larsson et al. | |
| 7,779,039 B2 | 8/2010 | Weissman et al. | |
| 8,775,517 B1 | 7/2014 | Goldman et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072808 A1 * | 6/2002 | Li | G06Q 10/06398 |
| | | | 700/5 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0178146 A1 | 11/2002 | Akella et al. | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0105732 A1 | 6/2003 | Kagalwala et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0133500 A1 | 7/2004 | Thompson et al. | |
| 2004/0138958 A1 | 7/2004 | Watarai et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0250163 A1 * | 12/2004 | Roddy | G06F 11/2257 |
| | | | 714/25 |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0097204 A1 | 5/2005 | Horowitz et al. | |
| 2005/0154710 A1 | 7/2005 | Ruhlow et al. | |
| 2005/0154757 A1 | 7/2005 | Barsness et al. | |
| 2005/0198011 A1 | 9/2005 | Barsness et al. | |
| 2005/0257134 A1 * | 11/2005 | Goodman | G06F 17/243 |
| | | | 715/226 |
| 2006/0179041 A1 | 8/2006 | Ohi et al. | |
| 2006/0218132 A1 | 9/2006 | Mukhin et al. | |
| 2006/0271361 A1 | 11/2006 | Vora et al. | |
| 2007/0005420 A1 | 1/2007 | Roy et al. | |
| 2007/0073685 A1 | 3/2007 | Thibodeau et al. | |
| 2007/0136429 A1 | 6/2007 | Fine et al. | |
| 2008/0133514 A1 | 6/2008 | Relyea | |
| 2008/0189237 A1 | 8/2008 | Crivat et al. | |
| 2008/0222199 A1 | 9/2008 | Tiu et al. | |
| 2009/0006156 A1 | 1/2009 | Hunt et al. | |
| 2009/0055422 A1 | 2/2009 | Williams et al. | |
| 2009/0119172 A1 | 5/2009 | Soloff | |
| 2009/0177744 A1 | 7/2009 | Marlow et al. | |
| 2009/0319517 A1 | 12/2009 | Guha et al. | |
| 2010/0131496 A1 | 5/2010 | Strehl et al. | |
| 2010/0299367 A1 | 11/2010 | Chakrabarti et al. | |

(56) References Cited

U.S. PATENT DOCUMENTS

| | | |
|---|---|---|
| 2010/0318511 A1 | 12/2010 | Phan et al. |
| 2010/0324927 A1* | 12/2010 | Tinsley ................. G06F 19/322 705/2 |
| 2011/0082854 A1 | 4/2011 | Eidson et al. |
| 2011/0191290 A1 | 8/2011 | Gutlapalli et al. |
| 2011/0191361 A1 | 8/2011 | Gupta et al. |
| 2011/0282806 A1 | 11/2011 | Wilcox |
| 2012/0047158 A1 | 2/2012 | Lee et al. |
| 2012/0072972 A1 | 3/2012 | Christiansen et al. |
| 2012/0178146 A1 | 7/2012 | Auffret et al. |
| 2012/0215560 A1 | 8/2012 | Ofek et al. |
| 2012/0310763 A1 | 12/2012 | Meehan |
| 2012/0317058 A1 | 12/2012 | Abhulimen |
| 2013/0151567 A1 | 6/2013 | Ellison et al. |
| 2013/0238979 A1 | 9/2013 | Sayers et al. |
| 2013/0268520 A1 | 10/2013 | Fisher et al. |
| 2014/0019207 A1 | 1/2014 | Kraus et al. |
| 2014/0024348 A1* | 1/2014 | Hurst ................. H04M 3/5232 455/414.1 |
| 2014/0040162 A1* | 2/2014 | McConnell ....... G06F 17/30312 705/347 |
| 2014/0052750 A1 | 2/2014 | Ciabrini et al. |
| 2014/0074805 A1 | 3/2014 | Kapoor et al. |
| 2014/0081950 A1 | 3/2014 | Rajan et al. |
| 2014/0114941 A1 | 4/2014 | Ahlberg et al. |
| 2014/0149554 A1 | 5/2014 | Krishna et al. |

OTHER PUBLICATIONS

Non-Final Office Action for U.S. Appl. No. 14/014,204 dated Aug. 12, 2015, 18 pages.
Wilson, "Machine Learning Throwdown" Year 2012.
"Prior Knowledge: A Predictive Database for Developers," by Alex Williams, dated Sep. 11, 2012, http://techcrunch.com/2012/09/11/prior-knowledge-a-predictive-database-for-developers/, 7 pages.
"A probabilistic model of cross-categorization," by Patrick Shafto et al., dated Feb. 7, 2011, 44 pages.
"Cross-Categorization: A Method for Discovering Multiple Overlapping Clusterings," by Vikash K. Mansinghka et al., dated Jan. 1, 2009, 3 pages.
International Search Report & Written Opinion for International Application No. PCT/US2013/070198, dated Feb. 4, 2014, 8 pages.
"Learning with Bayesian Networks and Probability Trees to Approximate a Joint Distribution" by Cano et al., dated Nov. 22, 2011, IEEE, 6 pages.
"Efficient Distribution-free Learning of Probabilistic Concepts" by Kearns et al., Laboratory of Computer Science, 1990, IEEE, 10 pages.
Non-Final Office Action for U.S. Appl. No. 14/014,250 dated Aug. 17, 2015, 41 pages.
Non-Final Office Action for U.S. Appl. No. 14/014,221 dated Aug. 26, 2015, 8 pages.
Non-Final Office Action for U.S. Appl. No. 14/014,236 dated Jul. 16, 2015, 22 pages.
Non-Final Office Action for U.S. Appl. No. 14/014,225 dated Jul. 8, 2015, 48 pages.
Non-Final Office Action for U.S. Appl. No. 14/014,241 dated Jun. 22, 2015, 24 pages.
Non-Final Office Action for U.S. Appl. No. 14/014,269 dated Sep. 8, 2015, 37 pages.
International Preliminary Report on Patentability for International Application No. PCT/US2013/070198, dated Sep. 24, 2015, 5 pages.
Non-Final Office Action for U.S. Appl. No. 14/014,271, dated Jan. 13, 2016, 34 pages.
Final Office Action for U.S. Appl. No. 14/014,236, dated Feb. 11, 2016, 12 pages.
Final Office Action for U.S. Appl. No. 14/014,271 dated Aug. 26, 2016, 37 pgs.
Non-Final Office Action for U.S. Appl. No. 14/992,925, dated Dec. 1, 2016, 12 pages.
Office Action for U.S. Appl. No. 14/014,271, dated Feb. 9, 2017, 32 pages.

* cited by examiner

PREDICTIVE INTELLIGENCE FOR SERVICE AND SUPPORT

CROSS REFERENCE TO RELATED APPLICATIONS

This United States patent application is related to, and claims priority to U.S. Provisional Patent Application No. 61/906,346 filed Nov. 19, 2013, entitled "Predictive Intelligence for Service and Support", the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to computing, and more particularly, embodiments relate to predictive intelligence for service and support.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

In operations, client organizations with large datasets in their databases can benefit from predictive analysis using such data. However, client organizations are generally required to hire technical experts to develop customized mathematical constructs and predictive models, which are very expensive. Consequently, client organizations without vast financial means are priced out of the market and thus do not have access to predictive analysis capabilities for their datasets.

Client organizations that do have the financial means to hire technical and mathematical experts to develop the necessary mathematical constructs and predictive models suffer from a common problem with customized solutions. Specifically, the customized solution is tailored to the particular problem at hand at a given point in time, and as such, the customized solution is not able to accommodate changes to the underlying data structure, is not able to accommodate changes to the types of data stored within the client's datasets, and is not capable of scaling up to meet increasing and changing demands of the client as their business and dataset grows over time.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
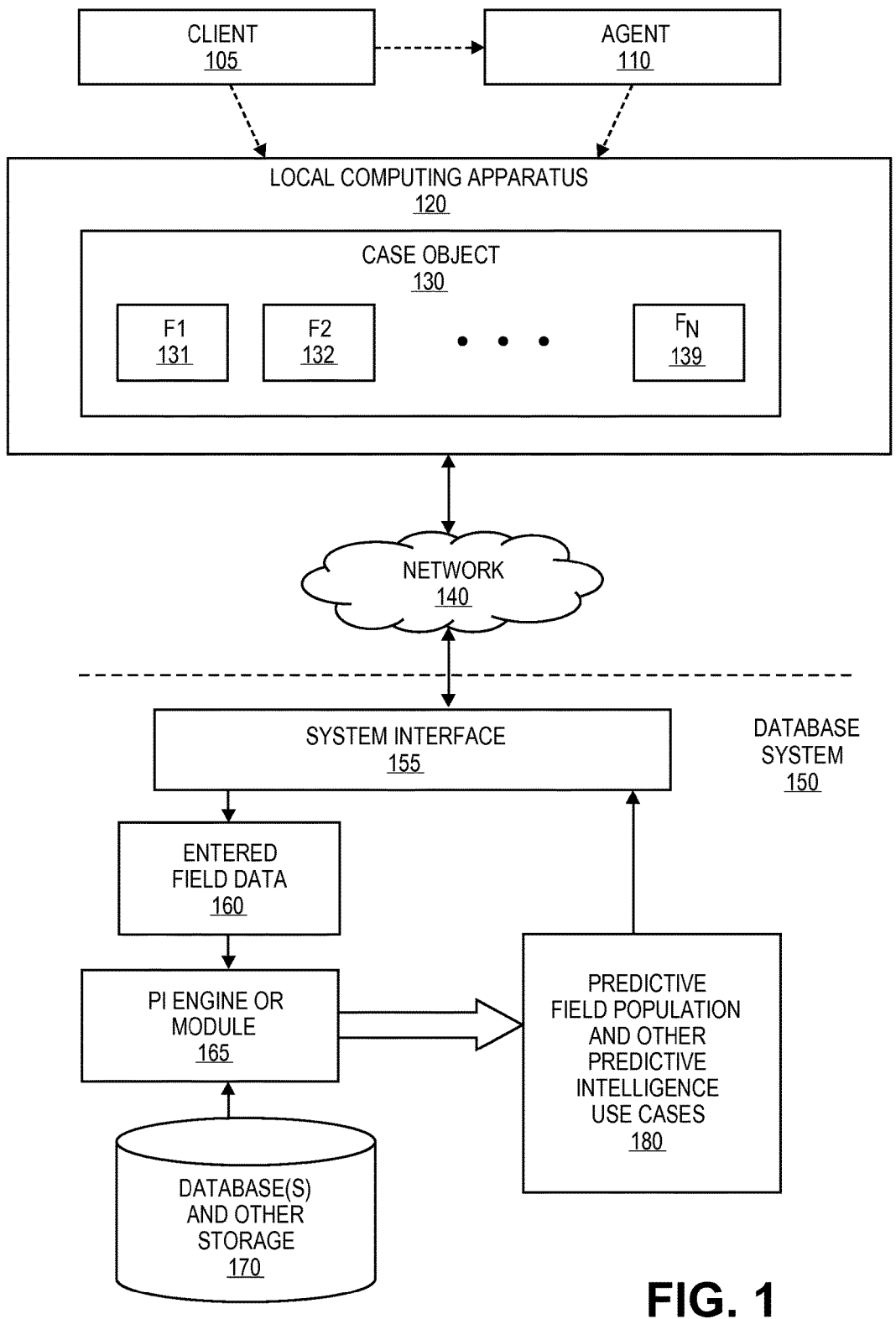
FIG. 1 is an illustration of predictive intelligence operation according to an embodiment.

In the following description, numerous specific details are set forth. However, embodiments may be practiced without these specific details. In other instances, well-known circuits, structures and techniques have not been shown in detail in order not to obscure the understanding of this description.

Client organizations who desire to perform predictive analytics and data mining against their datasets must normally hire technical experts and explain the problem they wish to solve and then turn their data over to the hired experts to apply customized mathematical constructs in an attempt to solve the problem at hand. The present state of the art may therefore benefit from methods, systems, and apparatuses for implementing predictive intelligence for service and support in a system such as an on-demand, multi-tenant database system including cloud-based computing systems and cloud-based services as described herein.

By analogy, in the past when computer engineers designed a computer system it was necessary to also figure out how to map data onto a physical disk, accounting for sectors, blocks, rotational speed, etc. Modern programmers are not required to concern themselves with these issues. Similarly, it is highly desirable to utilize a server and sophisticated database technology to perform data analytics for ordinary users without needing to hire specialized experts. By doing so, resources may be freed up to focus on other problems.

In some embodiments, the methodologies described herein provide systems and methods for predictive query implementation and usage in a system such as an on-demand and/or multi-tenant database system. In some embodiments, the methodologies shift mathematical and technological complexity into a hosted database system, and thus out of the view of the users. In doing so, the learning curve to novice users is reduced and thus, the predictive technology is made available to a greater swath of the market place.

Certain machine learning capabilities exist in conventional systems. For instance, present capabilities may predictively answer questions such as, "Is this particular person going to buy product x?" However, existing technologies are not practical when addressing a wide range of different problems. For instance, a large healthcare corporation with vast financial resources may be able to hire technical experts to develop customized analytics to solve a specific problem based on the large healthcare corporations' local proprietary database, but a small company by contrast cannot afford to hire such service providers as the cost far outweighs a small company's financial resources to do so. Moreover, even if an organization invests in such a customized solution, that solution is locked to the specific problem solved and cannot scale to new problems, new inquiries, changing data types or data structures, and so forth. As such, the custom developed solution will decay over time as it becomes less aligned to the new and ever changing business objectives of the organization. Consequently, the exemplary small company must forego solving the problem at hand whereas the entity having hired experts to develop a custom solution are forced to re-invest additional time and resources to update and re-tool their customized solution as business conditions, data, and objectives change over time.

Conventional services offered by technical experts in the field of analytics and predictive modeling provide solutions that are customized to the particular dataset of the customer. Such services do not offer capabilities that may be used by non-experts and do not offer solutions that are abstracted from a particular underlying dataset. Instead, the models developed require specialized training to implement and utilize, and such models are anchored to the particular underlying dataset for which they are developed.

In some embodiments, methodologies described herein provide a foundational architecture by which the variously described query techniques, interfaces, databases, and other functionality is suitable for use by a wide array of customer organizations and users of varying level of expertise as well as underlying datasets of varying scope.

In an example, Salesforce.com provides on-demand cloud services to clients, organizations, and end users, wherein behind those cloud services is a multi-tenant database system that permits users to have customized data, customized field types, and so forth. The underlying data and data structures are customized by the client organizations for their own particular needs. In some embodiments, the methodologies provided herein are operable to analyze and query these datasets and data structures, the methodologies not being anchored to any particular underlying database scheme, structure, or content.

Customer organizations applying predictive intelligence may benefit from the low cost of access made possible by the high scalability of the solutions. In an example, a cloud service provider may elect to provide the capability as part of an overall service offering at no additional cost, or may elect to provide the additional capabilities for an additional service fee. In either case, customer organizations are not required to invest a large sum up front for a one-time customized solution, as is the case with conventional techniques. Because the capabilities may be systematically integrated into a cloud service's computing architecture and because they do not require experts to custom tailor solutions for each particular client organizations' dataset and structure, the scalability brings massive cost savings, thus enabling even small organizations with limited financial resources to benefit from predictive query and latent structure query techniques. Large companies with the financial means may also benefit due to the cost savings available to them and may further benefit from the capability to institute predictive query and latent structure query techniques for a much larger array of inquiry than was previously feasible utilizing conventional techniques.

In some embodiments, a means for predictive query and latent structure query implementation and usage in a multi-tenant database system execute at an application in a computing device, a computing system, or a computing architecture, in which the application is enabled to communicate with a remote computing device over a public Internet, such as remote clients, thus establishing a cloud based computing service in which the clients utilize the functionality of the remote application which implements the predictive and latent structure query and usage capabilities.

In some embodiments, methodologies for a predictive query and latent structure query implementation and usage in a multi-tenant database system, as is described herein and enabled by the systems of the implementing host organization, such as salesforce.com or another cloud computing services provider enable a variety of Predictive Intelligence use cases and predictive actions including, for example:

1. Identification and routing of Similar Cases;
2. Identification and solicitation of Case Experts (e.g., via Knowledgeable);
3. Chatter On and Chatter Off modes;
4. Case Pre-population (auto classification) throughout the system and its interfaces;
5. SLA (Service Level Agreement) Violation Risk/Priority Rank/Case Resolution time;
6. Identification and routing Similar Leads in support of sales and other business activity;
7. Large Incident Early Warning;
8. Case Assignment (users and queues);
9. Provision of mail Response;
10. Improved Customer Churn metrics;
11. Next Best (Service) Action;
12. Social Post Threading;
13. Workforce Planning.

In some embodiments, Predictive Intelligence methodologies enable a Case Pre-population operation via predictive inquiry. In an example, a particular operation may proceed as follows:

1. Agent takes a call from a client, and begins filling in case data in a data system based at least in part on information received from a client.

2. The system, applying a Predictive Intelligence algorithm, fills in certain data fields for the agent based upon previous cases.

3. The system recommends questions for the agent to ask based on previous cases that have been solved with similar attributes.

In some embodiments, Predictive Intelligence may be utilized in determining SLA (Service Level Agreement) violation risk, priority rank, and case resolution time. In some embodiments, a Predictive Intelligence algorithm:

1. Supports prediction of case field values;

2. As case lifecycle progresses, the guesses made by the Predictive Intelligence algorithm become more accurate;

3. Provides severity prediction;

4. Provides case classification (such as status and priority);

5. Provides for filling in data fields based on input content as an agent inputs the data 6. Reduces SLA violation risk by re-route queries or providing auto-escalation of response based on input;

7. Operates with live chat, such as Live Agent on new routing engine

In some embodiments, Predictive Intelligence algorithms enable Case Assignment (users and queues) use case via predictive inquiry, through incorrect or non-optimal routing detection and correction.

In some embodiments, application of a Predictive Intelligence algorithm enables an alternative Case Pre-population use case via predictive inquiry, as follows: Each time a new case is created via any channel, the Predictive Intelligence algorithm may predict the value of every structured field in the case object (both standard and custom fields). With these predictions in hand, a range of potentially valuable actions is possible. Specific examples may include:

For those data fields left blank (i.e., not observed in actual data, not filled in by the customer, and not collected via that channel): The predicted values from an algorithm form the basis for a more complete and actionable case report. This completion of a case report allows a representative to see a more useful picture than would otherwise be the case, for example, and it also helps in correctly routing and assigning the case via org-specific rules.

For those data fields that were filled in (actually observed/recorded by the underlying dataset): The predicted value, if confidently guessed by an algorithm to be different from the supplied value, can indicate that the entered value was an error, notwithstanding the fact that the field was observed. The field may then be flagged for inspection in, or automatically updated if appropriate in certain circumstances, for instance, based on type, allowable range, transposition, confidence, masking, and other such factors.

In some embodiments, just as a planned number of different features can be built on top of the similar cases platform, added functionality supports a number of different capabilities. For example:

Automatic case categorization: Rather than having a customer complete a form with drop downs values for data fields, Predictive Intelligence exploitation of the predictive query and latent structure query implementation and usage may predict fields such as category and application area from the free text description of the problem. This process may especially helpful in the email channel, where collection of data is problematic due to the general lack of structured fields in emails.

Automatic severity detection and pre-escalation: A prediction may be made by a Predictive Intelligence algorithm whether a case is very likely to result in escalation of response, and, if so, preemptively trigger the escalation to improve customer satisfaction, cycle time, and use of expert resources. For many installations, this interacts with a routing rules module or system. A benefit of such operation is to completely bypass the lower tiers of service in those cases where the Predictive Intelligence algorithm's predictions are of sufficient confidence quality that lower tier level services and efforts will be wasted.

Real-time completion: As a customer is, for example, filing a case on the web or other interface, a Predictive Intelligence algorithm's predictions predict the various structured fields from the free text description and present the predicted values for approval by the user. In addition to aiding the user with data entry, the feature highlights the otherwise-hidden Predictive Intelligence prediction technology behind the scenes.

In some embodiments, a method includes receiving at an interface for a database system data entered in one or more data fields regarding service of a first case for a first client, the data being received from the first client or from an agent entering data regarding the first case; automatically comparing by the database system the data for the first case with data for other cases stored in a data store of the database system; identifying by the database system one or more similar cases based on the comparison of data; automatically generating by a predictive intelligence algorithm applied by the database system one or more predictive actions for the first case based on the identified one or more similar cases; and transmitting data regarding the one or more predictive actions to the first client or agent.

In some embodiments, a database system includes an interface to receive and transmit data, the interface to receive data regarding a first case for a first client, the being received from the first client or from an agent entering data regarding the first case; a data store to store data including for a plurality of prior cases; and a processing unit, the processing unit to process data entered in one or more data fields for the first case, the processing unit to compare the data for the first case with data for the prior cases stored in a data store and identify one or more similar cases based on the comparison of data; wherein a predictive intelligence engine is to apply a predictive intelligence algorithm to automatically generate one or more predictive actions for the first case based on the identified one or more similar cases, and wherein the database system is to transmit data regarding the one or more predictive actions to the first client or agent.

FIG. 1 is an illustration of predictive intelligence operation according to an embodiment. As illustrated in FIG. 1, a client 105 or agent 110 acting on behalf of a client (such as a agent providing service support to a client) may be enter data for a case into a case object 130 (or other similar data structure) using a local computer device 120, such as a computer device for a particular organization in a multi-tenant environment. The computing device 120 may be a personal computer, terminal, mobile device, smartphone, or other computing device. The case data may be entered into a number of fields or similar entry points, such as the illustrated fields F1 121, F2 122, and continuing through $F_N$ 129. In some embodiments, the local computer device 120 may be connected via network 140, such as the Internet or other network, to a database system 150, and the database system may receive entered field data 160 such as database entered (including partially completed fields in some instances) via an system interface 155. The database system may be a multi-tenant database system, and may herein also be referred to as a predictive intelligence system, meaning a database system that includes predictive intelligence capability in addition to any other capabilities.

In some embodiments, the database system 150 includes a predictive intelligence engine or module 165 to implement a Predictive Intelligence algorithm. In some embodiments, the predictive intelligence engine or module 165 operates to use the entered data 160 and accessible database(s) and other storage to find similar cases, where such cases may or may not be resolved. In some embodiments, the engine or module 165 will generate data for pre-population of fields of the case object 130 and other predictive intelligence use cases 180, such as the functions describe above, and return this information to the client 105 or agent 110 as appropriate for use in addressing the current case.

Figure 2:
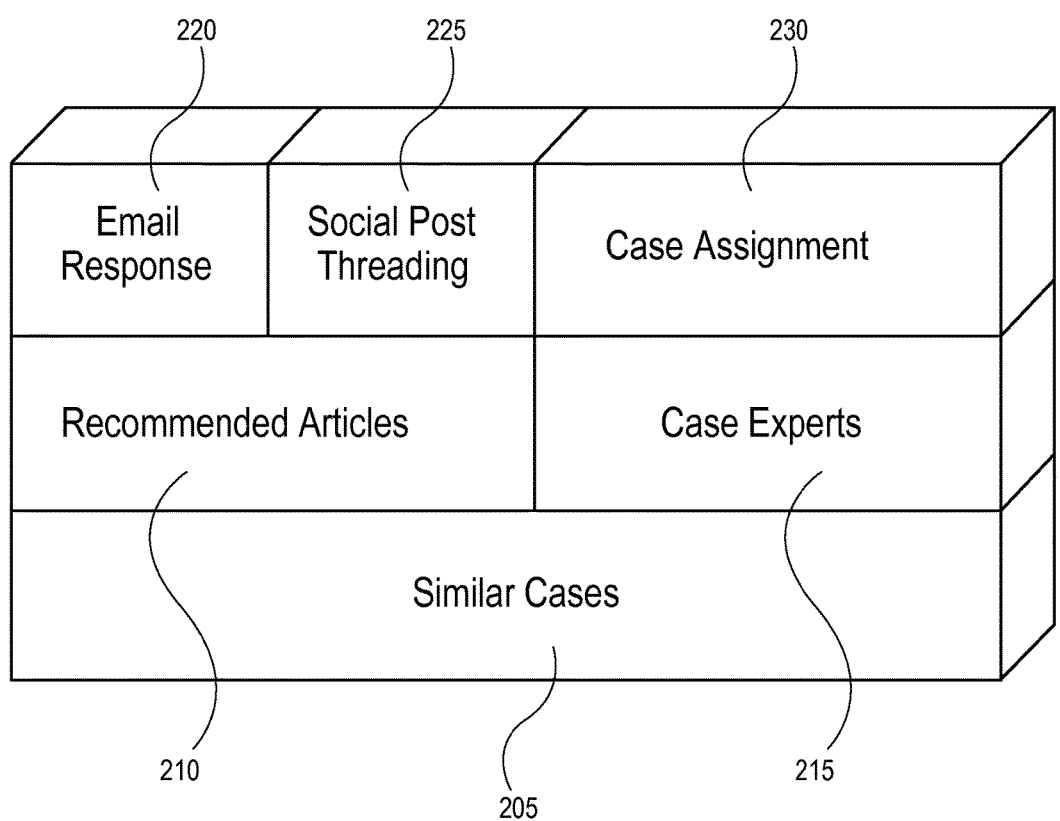
FIG. 2 is an illustration of elements for application of predictive intelligence according to an embodiment.

FIG. 2 is an illustration of elements for application of predictive intelligence according to an embodiment. As illustrated, predictive intelligence may identify and apply one or more of a number of different types of information. In some embodiments, the information includes similar cases 205 (such as in identifying similar cases to determine whether similar solutions may apply), recommended articles 210, case experts 215 (such as in identifying an expert who has solved similar issues), email response 220 (identifying a relevant email response), social post threading 225 (identifying a relevant social post thread in which similar issues have been discussed), and case assignment (identifying who have been assigned similar cases).

In a particular embodiment, for a given case a Predictive Intelligence apparatus or system will identify similar cases to a case that is being reported. A determination of similarity may include a comparison of the content of the case with earlier cases. In some embodiments, a comparison of case includes analyzing case object fields and case child object fields. In some embodiments, comparison may include extracting keywords from Subject, Description and other important text fields.

Similar Cases—Next Best Action: In some embodiments, an apparatus, system, or process applying a Predictive Intelligence algorithm may suggest similar cases that have already been successfully resolved. Further, an apparatus, system, or process may identify knowledge articles used to resolve similar cases, and, if these articles have not already been shared with the customer, suggest sharing them as the next best action.

Similar Cases—Problem Management: In some embodiments, an apparatus, system, or process applying a Predictive Intelligence algorithm identifies cases with the same underlying problem, and identify similar cases that may or may not been resolved. In some embodiments, there is a determination if the current case and identified cases are likely related to the same root cause. In some embodiments, cases may be grouped under a common parent "problem" case. In some embodiments, parent case actions may be applied to child cases (e.g. close case). In some embodiments, a system may proactively reach out to customers who own same product for which the case arose.

Additional Features: In some embodiments, a confidence factor is included with a Suggested Article component, wherein a confidence factor represents a level of confidence in a prediction. In some embodiments, a system applying a Predictive Intelligence algorithm may include an ability to display suggested articles even if they are not included in keyword search or data category filtered results API/apex method get.

Suggested Articles—Similar Cases: In some embodiments, a component Case API/apex method getSimilarCases operates to expose what variables determined the results set, including ranking; Standard Similar Cases Flow step; Input CaseId; output a Case sObject of similar Cases; and Standard Problem Management Flow.

Figure 3:
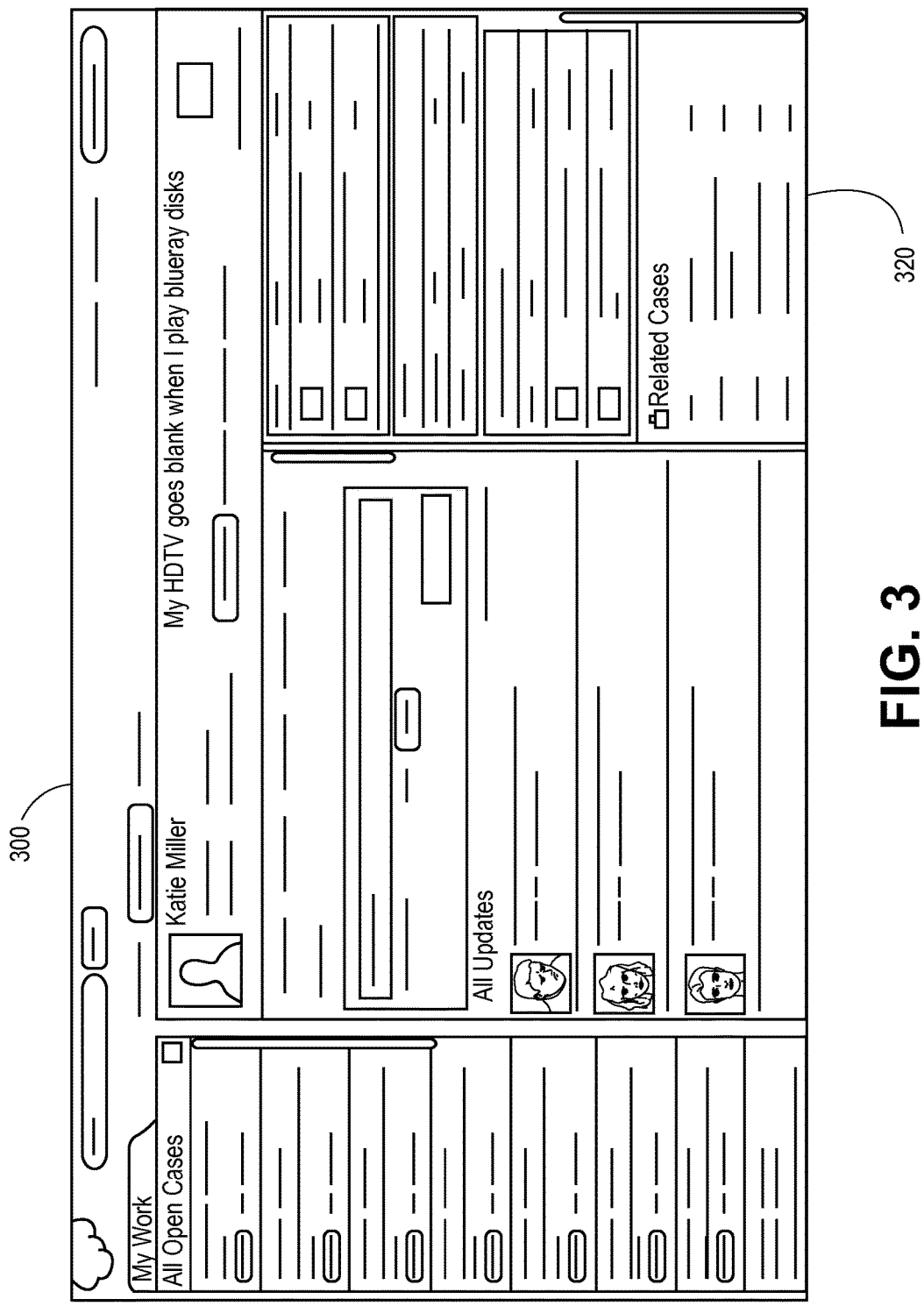
FIG. 3 is an illustration of an interface for a Predictive Intelligence apparatus or system according to an embodiment.

FIG. 3 is an illustration of an interface for a Predictive Intelligence apparatus or system according to an embodiment. In an example, a screen 300 may include a related cases interface 320, as illustrated in the right hand corner of the screen 300, the related cases interface promoting predictively similar cases via the Predictive Intelligence apparatus or system's predictions that should be considered in more detail due to their similarity with the present case. In some embodiments, the related cases may be provided even when the details of the present case are in free form text, such as the entry, "My HDTV goes blank when I play Blu-ray disks."

In some embodiments, administration of an apparatus or system defines the criteria of a Case to analyze (which rows to include). In some embodiments, the apparatus or system allows ignoring of irrelevant or types of cases that don't require assistance. In some embodiments, the apparatus or system may leverage a same interface as workflow rules.

Figure 4:
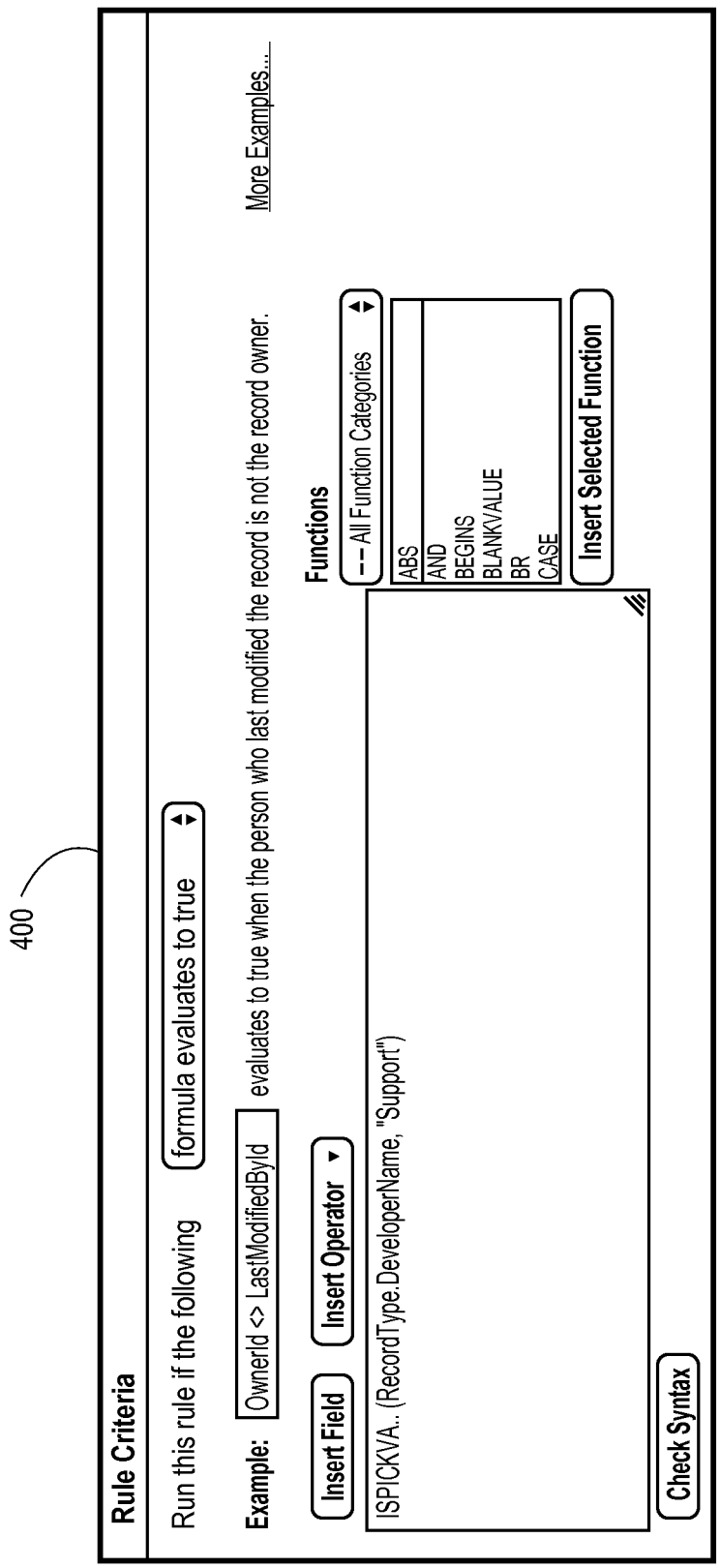
FIG. 4 is an illustration of an input screen for an apparatus or system to define fields for analysis according to an embodiment.

FIG. 4 is an illustration of an input screen 400 for an apparatus or system to define fields for analysis according to an embodiment. In some embodiments, a Predictive Intelligence apparatus or system includes a rule criteria input in which an administrator may define which fields on Case or Case children to use for predictive analysis.

Figure 5:
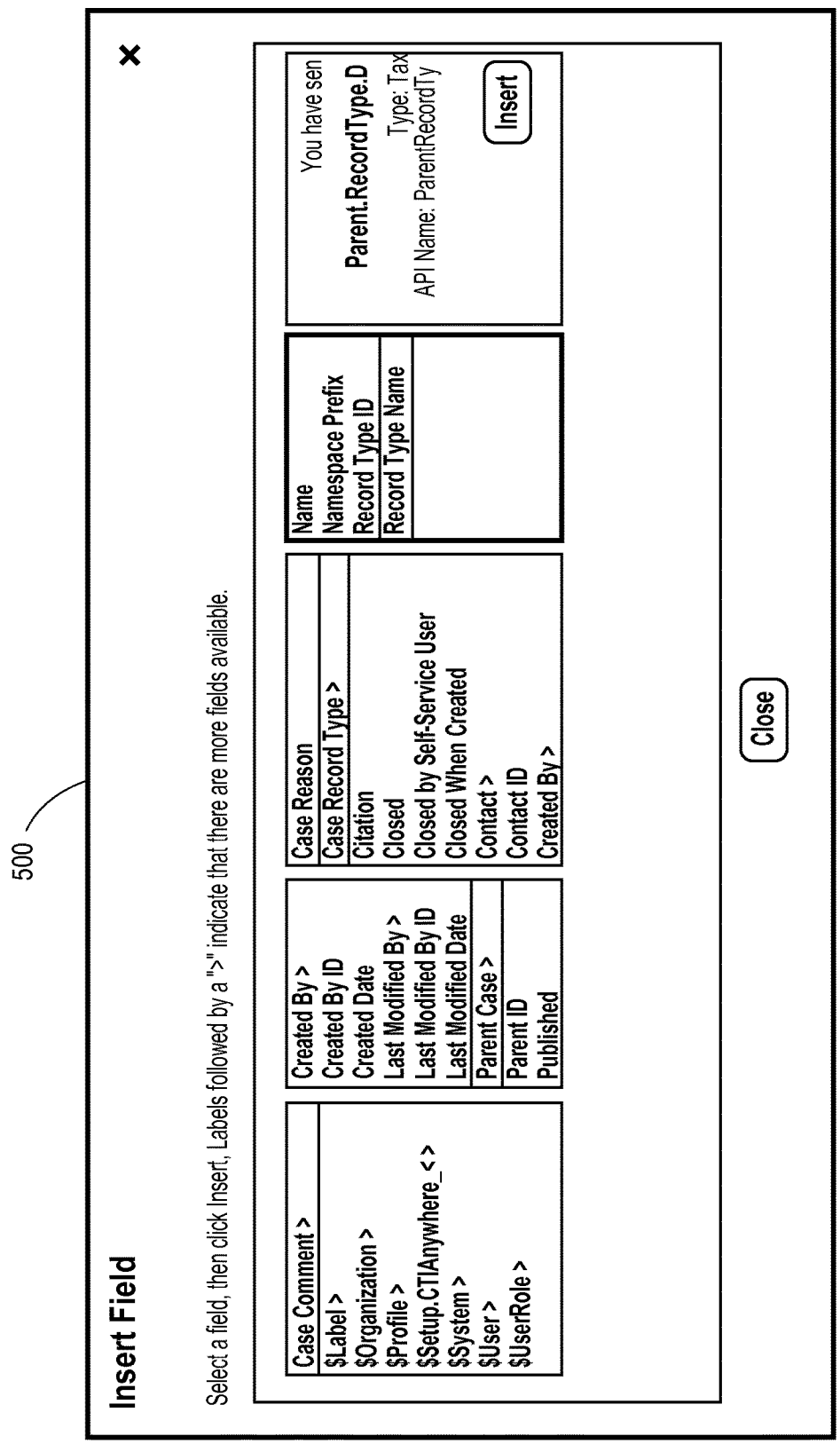
FIG. 5 is an illustration of an input screen for an apparatus or system to define successful resolution of a case according to an embodiment.

FIG. 5 is an illustration of an input screen 500 for an apparatus or system to define successful resolution of a case according to an embodiment. In some embodiments, a Predictive Intelligence apparatus or system includes an interface in which an administrator may determine the definition of "successfully resolved" for the purposes of predictive intelligence. For example, in a particular organization 96% of cases may be defined as successfully resolved, but an inquiry may be posed as to whether customers agree with the disposition. For instance: Was a case closed because of customer fatigue or did the servicer actually solve the customer's problem? What SLA's should be considered (external or internal)? In some embodiments, workflow rule criteria builder is leveraged to define what it means for a case to be "successfully resolved".

Figure 6:
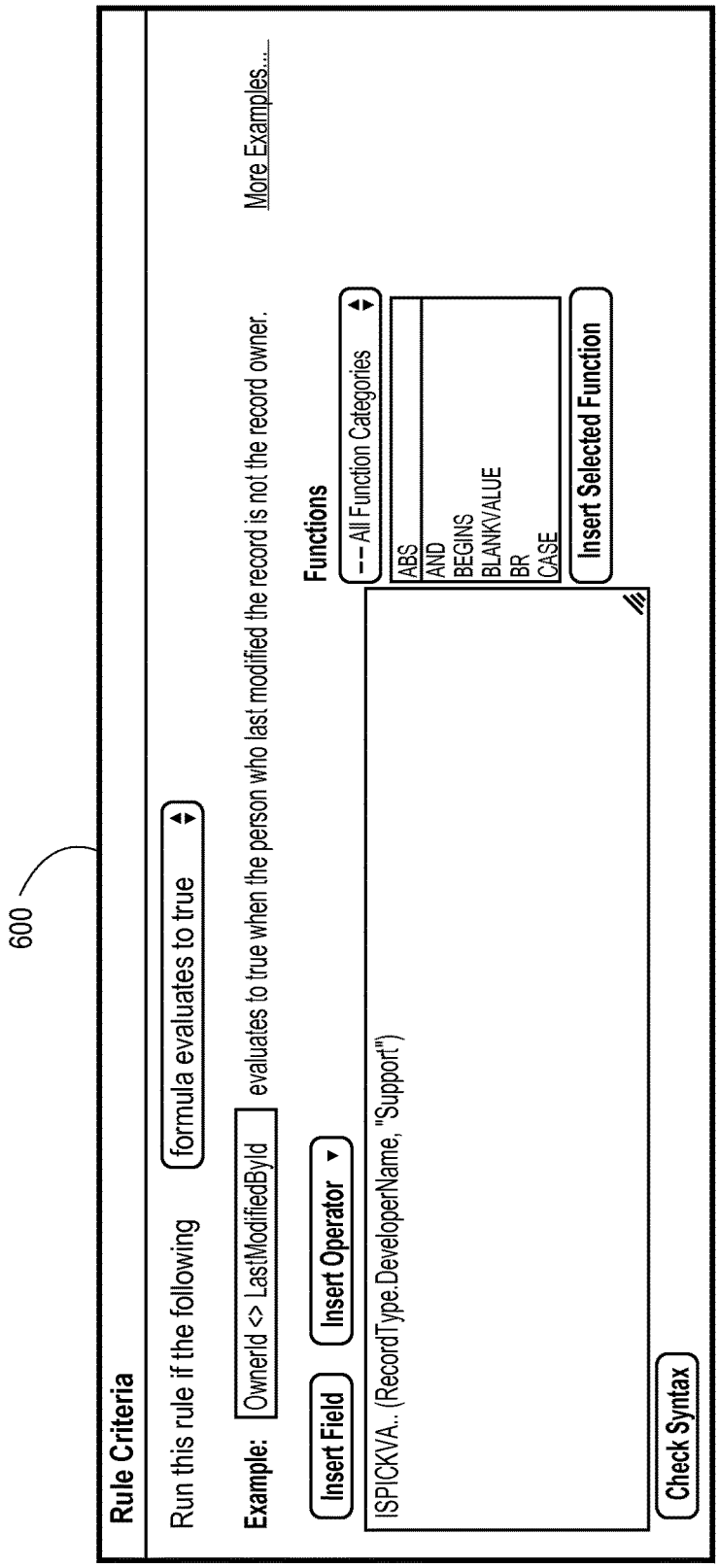
FIG. 6 is an illustration of an input screen for an apparatus or system to define confidence of results according to an embodiment.

FIG. 6 is an illustration of an input screen 600 for an apparatus or system to define confidence of results according to an embodiment. As illustrated, a further interface may be used for rule criteria. For instance, in a prototyped implementation of the most recent 500K cases from an organization snapshot: How many historical cases are required to generate useful results in predictive intelligence? In this manner, a confidence score can be used to determine how many cases are sufficient for predictive intelligence. For example, 1,000 cases may be sufficient for certain organizations whereas 500K may not be enough for others depending on their data.

In some embodiments, the confidence score can be utilized to tune the results to an acceptable level or to attain an acceptable confidence quality threshold. Leveraging most fields on the Case table to populate veritable table; did not use any child objects (e.g. Case Comment, Activities, Email Message, Case Article, Feed Item, Live Chat Transcript, Social Post); content in the child objects including data like number of interactions can be utilized; etc.

Similar Cases Pilot Scope: In some embodiments, a Setup Page is provided to define criteria for cases to extract for analysis (which rows in case table) including the ability to define the fields on case and case child entity fields to be included in the analysis; getSimilarCases API and apex method; Similar Cases component (Aura); getSimilarCasesArticles API and apex method; Similar Cases Suggested Articles component (Aura).

Additional Features enabled: In some embodiments, the same approach for Similar Cases can be applied to Email and Social Posts to help properly thread them; to identify Tweets or Facebook posts that weren't created via reply but which are in fact replies and route, link, re-structure them, etc.

Case Experts: In some embodiments, an algorithm's predictions can recommend the best users to resolve a given case and predict the resolution time for a given case for each expert.

Prioritized criteria: In some embodiments, Rules/priority to differentiate recommended users may be applied, as follows:
1. Successfully resolved the most similar case(s);
2. Shortest Resolution Time;
3. Fewest number of customer interactions;
4. Fewest number of total interactions;
5. Fewest number of instances of re-opening a Case;
6. Fewest number of Case Milestone Violations;
7. User is available;
8. User's workload is lighter in comparison with other possible choices.

Figure 7:
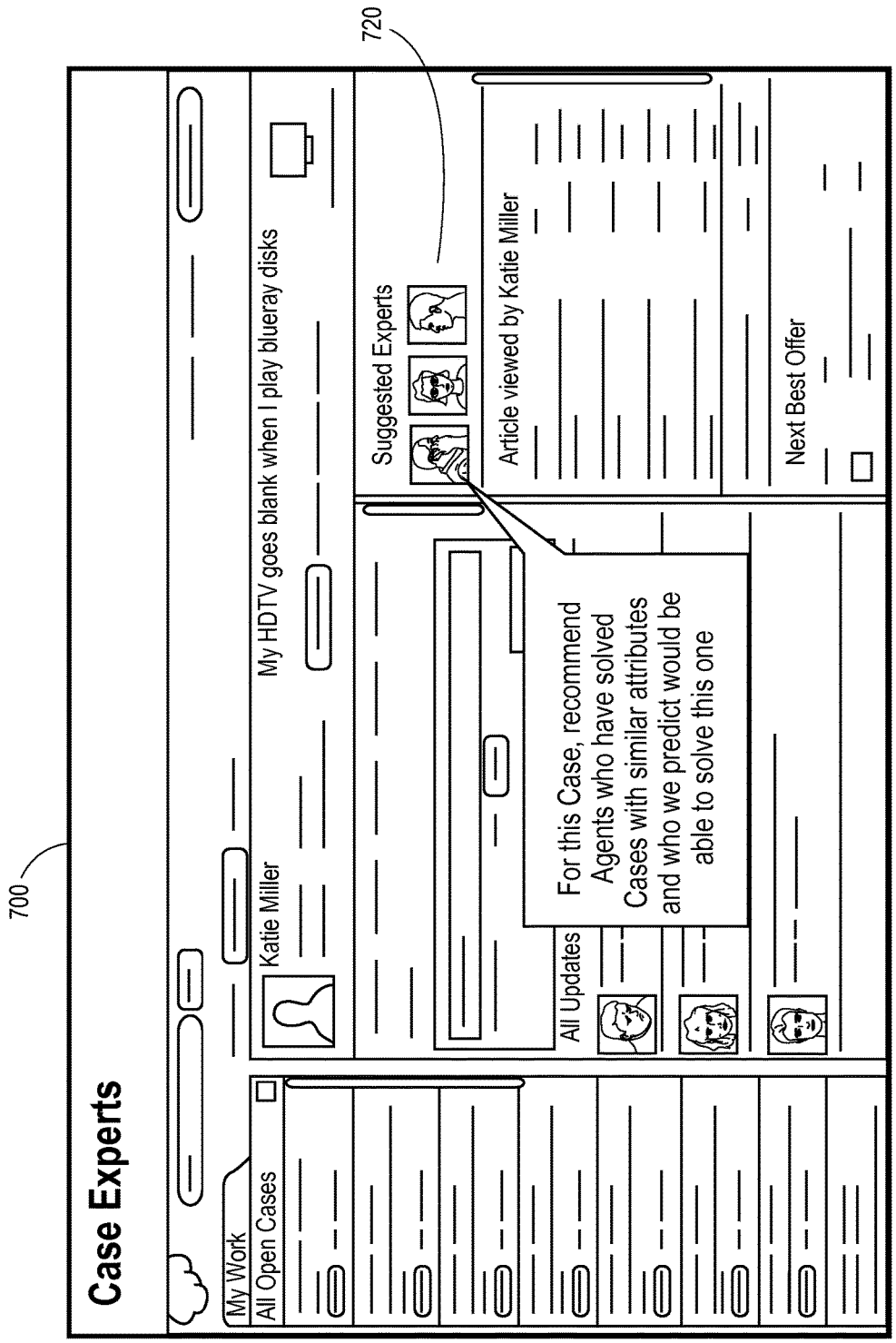
FIG. 7 describes selection, designation, routing, and election of case experts according to an embodiment.

FIG. 7 describes selection, designation, routing, and election of case experts according to an embodiment. In some embodiments, a setup page is provided to define criteria for which records to analyze (includes the definition of successfully resolved cases). The logic differentiates users who successfully resolved similar cases can be but does not have to be editable. Rules/priority may be applied in the process, as follows:
1. Greater confidence factor for the similar case;
2. Number of similar cases resolved;
3. Shortest Resolution Time;
4. Fewest number of customer interactions;
5. Fewest number of total interactions;
6. Fewest number of instances of re-opening a Case;
7. Fewest number of Case Milestone Violations.

In some embodiments, similar cases, case experts, and case assignment may be addressed as follows:
1. Definition of successfully resolved and closed Cases;
   a. Case.IsClosed=true, Case.ClosedDate < > null;
   b. Status values (Closed—Resolved);
2. Identify who resolved (or contributed) a Case;
   a. Case Owner who closed Case;
   b. Escalated to Users;
   c. Case History—includes full history of Case Owners.
3. Case owner Users and queue feature;
   a. Identify users or queues that were good or bad at resolving/closing a case;
4. Determination of success criteria such as closed not reopened;
   a. Closed within resolution time SLA;
5. Consideration of current workload when assigning;
   a. Ranking best resource without considering workload;
6. Provide a stacked ranking for cases that could be org wide or it could be used within a queue or list view to sort priority order;
   a. Use of an abstraction so that in can be determined whether a case is "very high priority" down to "very low priority";
7. Listing of what values are being predicted. Listing of Time to close. Other derived measure of success on the case (customizable).
8. Evaluation of whether the predictions (and the ensuing CSR recommendations) are good enough. UI for a domain-knowledgeable person to look at the recommendations and pass judgment for tuning purposes.

Figure 8:
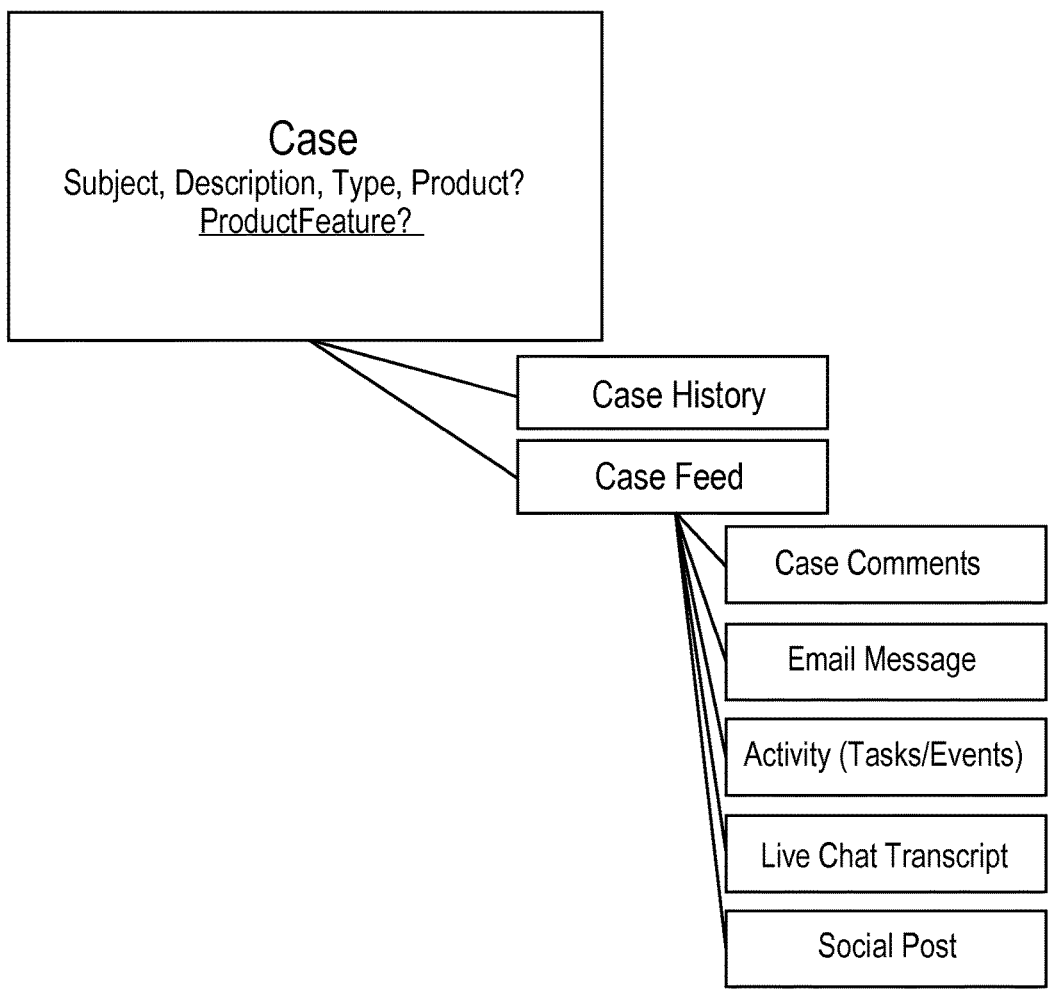
FIG. 8 is an illustration of a case data model for use with case experts and case assignment according to an embodiment.

With regard to similar cases, case experts, and case assignment, the following elements may apply:
1. Keywords/attributes
   a. Case Subject
   b. Case Description
   c. Case Type
   d. Case Reason
   e. Case Account Location (Address)
   f. Case Comment body
   g. Email Message
   h. Internal Note (Feed Item)
   i. Case.Asset.Product2Id or Case.ProductId
   j. Task
2. Case Attributes
   a. Case.Subject, Case.Description
   b. Case.Type
   c. Case.Reason
   d. Case.Asset.Product2Id or Case.ProductId
   e. Case.Origin
   f. Case.RecordType.Name
   g. c.Account.Type
   h. c.Account.Industry, c.Account.Sic
   i. c.Account.ShippingCountry, c.Account.ShippingPostalCode, c.Account.ShippingState, c.Account.ShippingCity FIG. 8 is an illustration of a case data model 800 for use with case experts and case assignment according to an embodiment. Certain high level use cases may include:
1. SLA Violation Risk (sorting priority)
   a. Case Trending History
   b. Use of Case children (e.g. feed, milestones)
   c. Individual Case, Roll up to Support Lead, Manager, VP
   d. Determination of priority ranking and assignment at large and within queues or groups
2. Similar Cases
   a. Indication of what aspects of the case are relevant to similar cases
      i. Subject, Description, Asset/Product
   b. Problem management, group multiple customer issues under a single problem
   c. Help for a given case, suggesting cases that are similar to a case for the purpose of identifying the resolution for the customer
3. Workforce Planning
   a. Based on expected resolution times drive workforce planning
   b. How many agents or technical support engineers does a service provider need to maintain a given set of service levels, which is delivered as a result based on predictive analysis of the service provider's observed data and rendered predictions by the Predictive intelligence algorithm techniques and exploitation of the predictive query and latent structure query implementation and usage.

Figure 9:
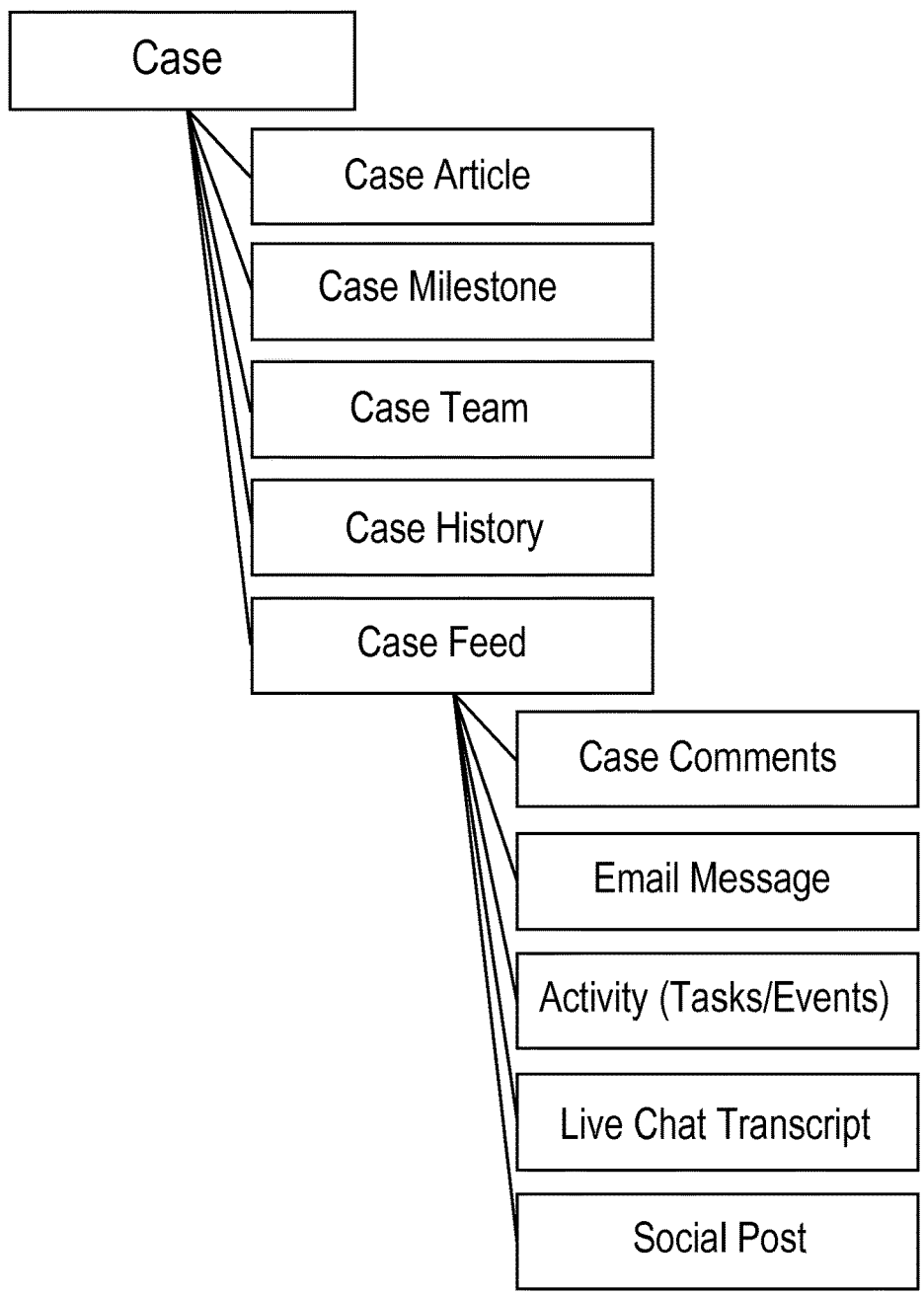
FIG. 9 is an illustration of an alternative case data model for use with case articles, milestones, teams, history, feeds, comments, messages, activities, live chat transcripts, and social posts according to an embodiment.

FIG. 9 is an illustration of an alternative case data model for use with case articles, milestones, teams, history, feeds, comments, messages, activities, live chat transcripts, and social posts according to an embodiment.

Figure 10:
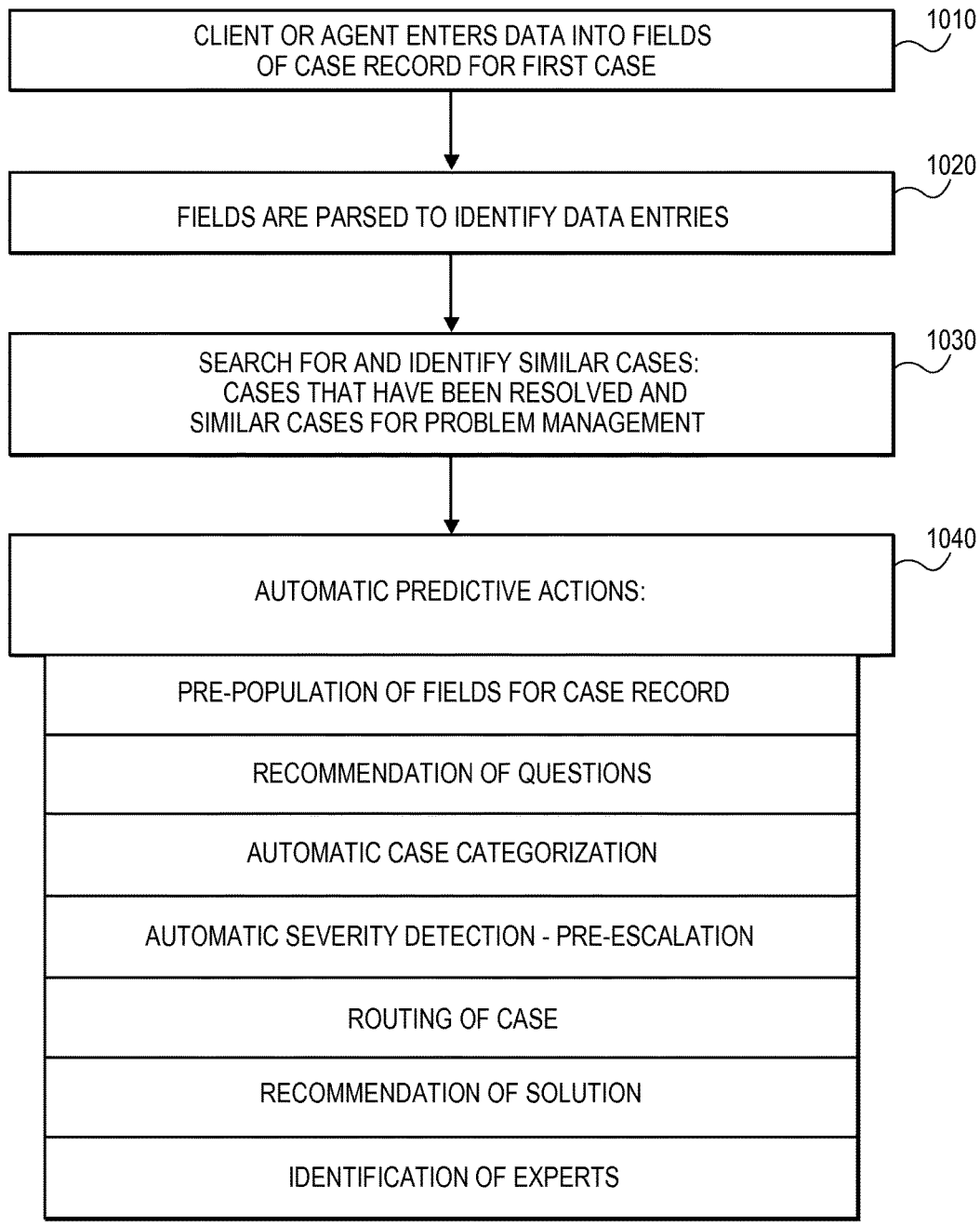
FIG. 10 is a flowchart to illustrate a process for application of a Predictive Intelligence algorithm according to an embodiment.

FIG. 10 is a flowchart to illustrate a process for application of a Predictive Intelligence algorithm according to an embodiment. However, algorithms are not limited to the particular process illustrated in FIG. 10. In some embodiments, a client or agent enters data into fields for a case record 1010. The fields of the case record are parsed to identify data entries 1020. In some embodiments, there is a search for and identification of similar cases, where such cases may be cases that are resolved for potential solutions or similar cases that may or may not be resolved that are identified for case management uses 1030.

In some embodiments, a predictive intelligence algorithm is applied using data from similar cases to automatically provide one or more predictive actions 1040, where the one or more predictive actions may include:

Pre-population of fields of the case record;
Recommendations of questions to provide to a client;
Automatic case categorization;
Automatic severity detection and possible pre-escalation of response based on the detected severity of the case;
Routing of case to appropriate parties;
Recommendation of solutions from detected similar cases; and
Identification of experts to assist.

Figure 11:
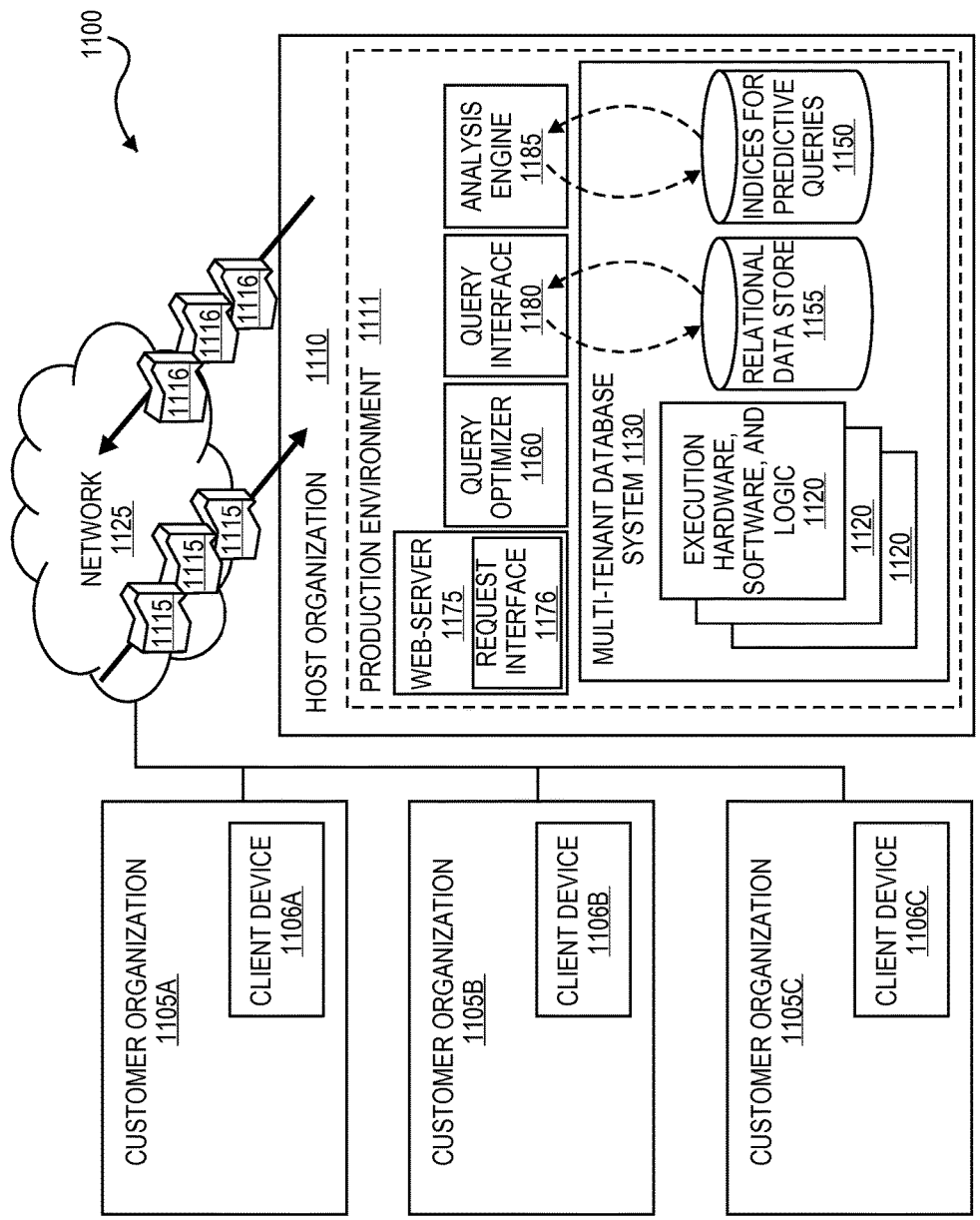
FIG. 11 depicts an exemplary architecture in accordance with described embodiments.

FIG. 11 depicts an exemplary architecture 1100 in accordance with described embodiments. In some embodiments, a production environment 1111 is communicably interfaced with a plurality of client devices 1106A-C through host organization 1110. In one embodiment, a multi-tenant database system 1130 includes a relational data store 1155, for example, to store datasets on behalf of customer organizations 1105A-C or users. The multi-tenant database system 1130 further stores indices for predictive queries 1150, for instance, which are generated from datasets provided by, specified by, or stored on behalf of users and customer organizations 1105A-C.

Multi-tenant database system 1130 includes a plurality of underlying hardware, software, and logic elements 1120 that implement database functionality and a code execution environment within the host organization 1110. In accordance with one embodiment, multi-tenant database system 1130 implements the non-relational data store—and separately implements a predictive database to store the indices for predictive queries 1150. The hardware, software, and logic elements 1120 of the multi-tenant database system 1130 are separate and distinct from a plurality of customer organizations (1105A, 1105B, and 1105C) that utilize the services provided by the host organization 1110 by communicably interfacing to the host organization 1110 via network 1125. In such a way, host organization 1110 may implement on-demand services, on-demand database services or cloud computing services to subscribing customer organizations 1105A-C.

Host organization 1110 receives input and other requests 1115 from a plurality of customer organizations 1105A-C via network 1125 (such as a public Internet). For example, the incoming PreQL queries, predictive queries, API requests, or other input may be received from the customer organizations 1105A-C to be processed against the multi-tenant database system 1130.

In some embodiments, each customer organization 1105A-C is an entity selected from the group consisting of: a separate and distinct remote organization, an organizational group within the host organization 1110, a business partner of the host organization 1110, or a customer organization 1105A-C that subscribes to cloud computing services provided by the host organization 1110.

In some embodiments, requests 1115 are received at, or submitted to, a web-server 1175 within host organization 1110. Host organization 1110 may receive a variety of requests for processing by the host organization 1110 and its multi-tenant database system 1130. Incoming requests 1115 received at web-server 1175 may specify which services from the host organization 1110 are to be provided, such as query requests, search request, status requests, database transactions, a processing request to retrieve, update, or store data on behalf of one of the customer organizations 1105A-C, and so forth. Web-server 1175 may be responsible for receiving requests 1115 from various customer organizations 1105A-C via network 1125 and provide a web-based interface to an end-user client device 1106A-C or machine originating such data requests 1115.

Query interface 1180 provides functionality to pass queries from web-server 1175 into the multi-tenant database system 1130 for execution against the indices for predictive queries 1150 or the relational data store 1155. In some embodiments, the query interface 1180 implements a PreQL Application Programming Interface (API) or a JavaScript Object Notation (JSON) API interface through which queries may be executed against the indices for predictive queries 1150 or the relational data store 1155. Query optimizer 1160 performs query translation and optimization, for instance, on behalf of other functionality that possesses sufficient information to architect a query or PreQL query yet lacks the necessary logic to actually construct the query syntax. Analysis engine 1185 operates to generate queryable indices for predictive queries from tabular datasets or other data provided by, or specified by users.

Host organization 1110 may implement a request interface 1176 via web-server 1175 or as a stand-alone interface to receive requests packets or other requests 1115 from the client devices 1106A-C. Request interface 1176 further supports the return of response packets or other replies and responses 1116 in an outgoing direction from host organization 1110 to the client devices 1106A-C. According to one embodiment, query interface 1180 implements a PreQL API interface and/or a JSON API interface with specialized functionality to execute PreQL queries or other predictive queries against the databases of the multi-tenant database system 1130, such as the indices for predictive queries at element 1150. For instance, query interface 1180 may operate to query the predictive database within host organization 1110 in fulfillment of such requests 1115 from the client devices 1106A-C by issuing API calls with PreQL structured query terms such as "PREDICT," "RELATED," "SIMILAR," and "GROUP." Also available are API calls for "UPLOAD" and "ANALYZE," so as to upload new data sets or define datasets to the predictive database 1150 and trigger the analysis engine 1185 to instantiate analysis of such data that in turn generates queryable indices in support of such queries.

Figure 12:
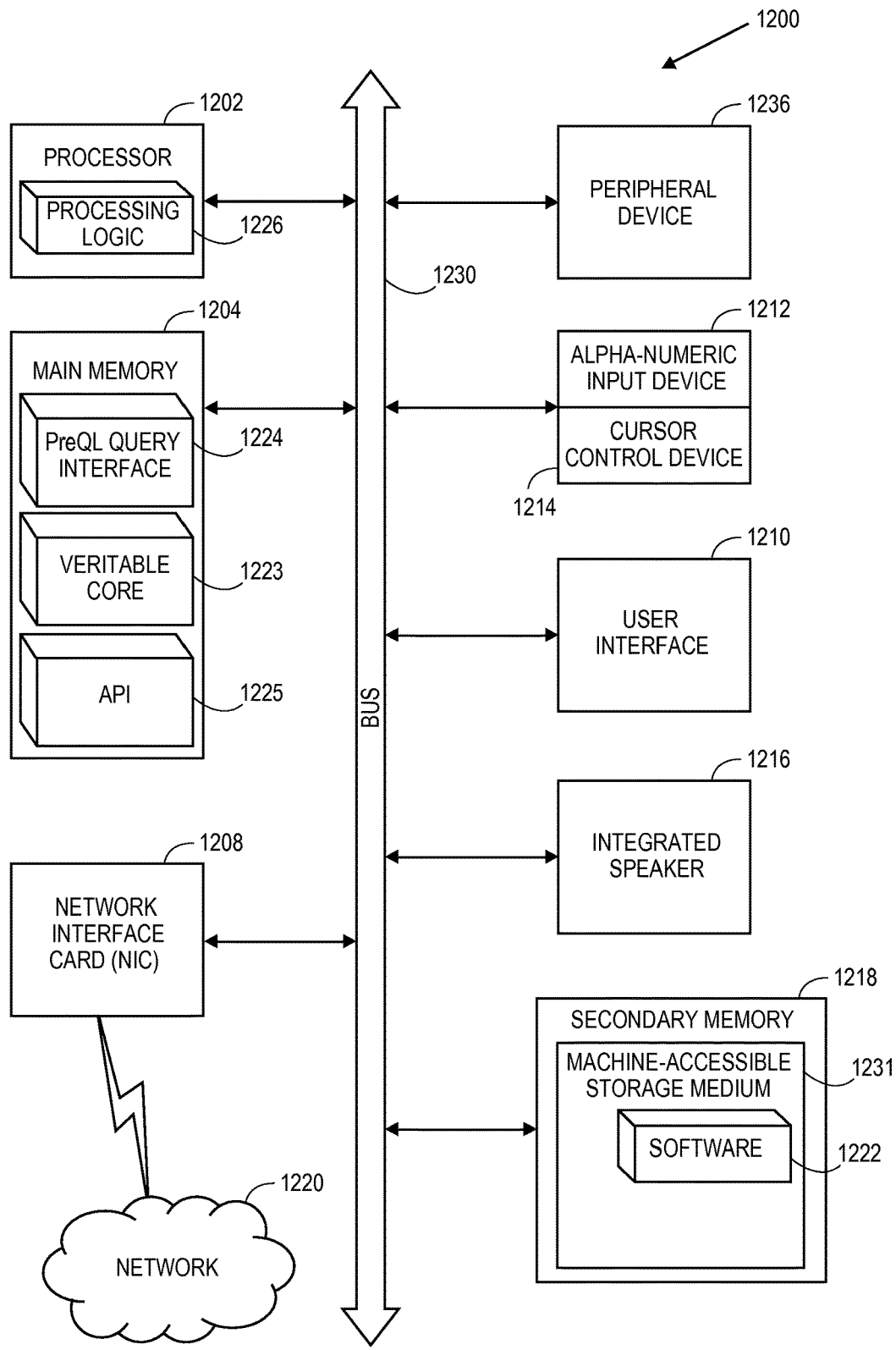
FIG. 12 illustrates a diagrammatic representation of a machine in the exemplary form of a computer system in accordance with an embodiment.

FIG. 12 illustrates a diagrammatic representation of a machine 1200 in the exemplary form of a computer system in accordance with an embodiment, within which a set of instructions, for causing the machine/computer system 1200 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1218 (e.g., a persistent storage device including hard disk drives and a persistent database and/or a multi-tenant database implementation), which communicate with each other via a bus 1230. Main memory 1204 includes the PreQL query interface 1224, the Veritable core 1223, and API 1225. Main memory 1204 and its sub-elements are operable in conjunction with processing logic 1226 and processor 1202 to perform the methodologies discussed herein.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations and functionality that is discussed herein.

The computer system 1200 may further include a network interface card 1208. The computer system 1200 also may include a user interface 1210 (such as a video display unit, a liquid crystal display (LCD), or a cathode ray tube (CRT)), an alphanumeric input device 1212 (e.g., a keyboard), a cursor control device 1214 (e.g., a mouse), and a signal generation device 1216 (e.g., an integrated speaker). The computer system 1200 may further include peripheral device 1236 (e.g., wireless or wired communication devices, memory devices, storage devices, audio processing devices, video processing devices, etc.).

The secondary memory 1218 may include a non-transitory machine-readable or computer readable storage medium 1231 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-readable storage media. The software 1222 may further be transmitted or received over a network 1220 via the network interface card 1208.

Figure 13:
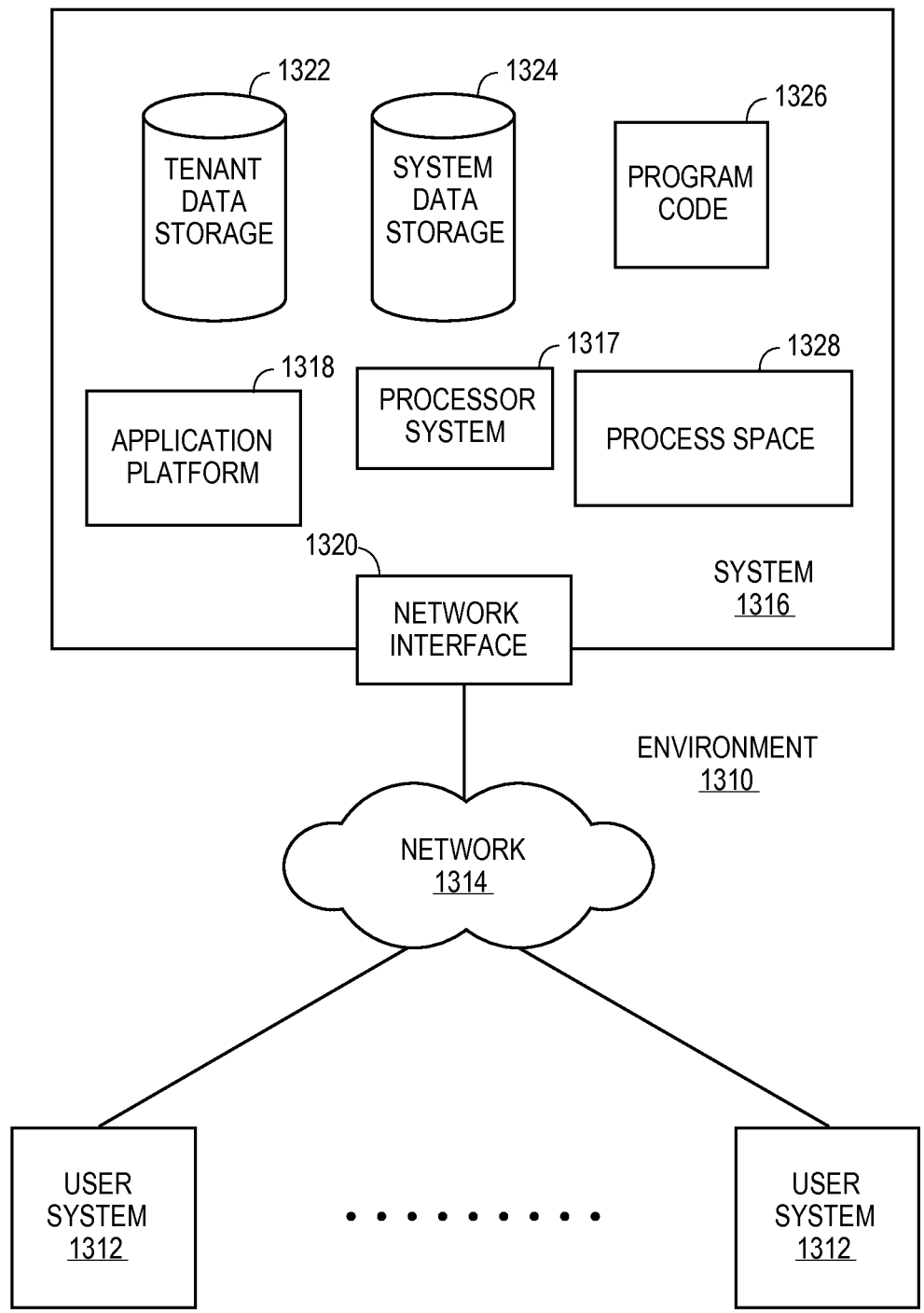
FIG. 13 illustrates a block diagram of an example of an environment in which an on-demand database service might be used in accordance with an embodiment.

FIG. 13 illustrates a block diagram of an example of an environment 1310 in which an on-demand database service might be used in accordance with an embodiment. Environment 1310 may include user systems 1312, network 1314, system 1316, processor system 1317, application platform 1318, network interface 1320, tenant data storage 1322, system data storage 1324, program code 1326, and process space 1328. In other embodiments, environment 1310 may not have all of the components listed and/or may have other elements instead of, or in addition to, those listed above.

Environment 1310 is an environment in which an on-demand database service exists. User system 1312 may be any machine or system that is used by a user to access a database user system. For example, any of user systems 1312 can be a handheld computing device, a mobile phone, a laptop computer, a workstation, and/or a network of computing devices. As illustrated in FIG. 13 (and in more detail in FIG. 14) user systems 1312 might interact via a network 1314 with an on-demand database service, which is system 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" is used interchangeably herein. A database image may include one or more database objects. A relational database management system (RDMS) or the equivalent may execute storage and retrieval of information against the database object(s). Application platform 1318 may be a framework that allows the applications of system 1316 to run, such as the hardware and/or software, e.g., the operating system. In an embodiment, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

The users of user systems 1312 may differ in their respective capacities, and the capacity of a particular user system 1312 might be entirely determined by permissions (permission levels) for the current user. For example, where a salesperson is using a particular user system 1312 to interact with system 1316, that user system has the capacities allotted to that salesperson. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some implementations, the interface between system 1316 and network 1314 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1316, shown in FIG. 13, implements a web-based customer relationship management (CRM) system. For example, in one embodiment, system 1316 includes application servers configured to implement and execute CRM software applications as well as provide related data, code, forms, webpages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications, including a CRM application. User (or third party developer) applications, which may or may not include CRM, may be supported by the application platform 1318, which manages creation, storage of the applications into one or more database objects and executing of the applications in a virtual machine in the process space of the system 1316.

One arrangement for elements of system 1316 is shown in FIG. 13, including a network interface 1320, application platform 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database-indexing processes.

Several elements in the system shown in FIG. 13 include conventional, well-known elements that are explained only briefly here. For example, each user system 1312 may include a desktop personal computer, workstation, laptop, PDA, cell phone, or any wireless access protocol (WAP) enabled device or any other computing device capable of interfacing directly or indirectly to the Internet or other network connection. User system 1312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314. Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units.

According to one embodiment, each system 1316 is configured to provide webpages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 14:
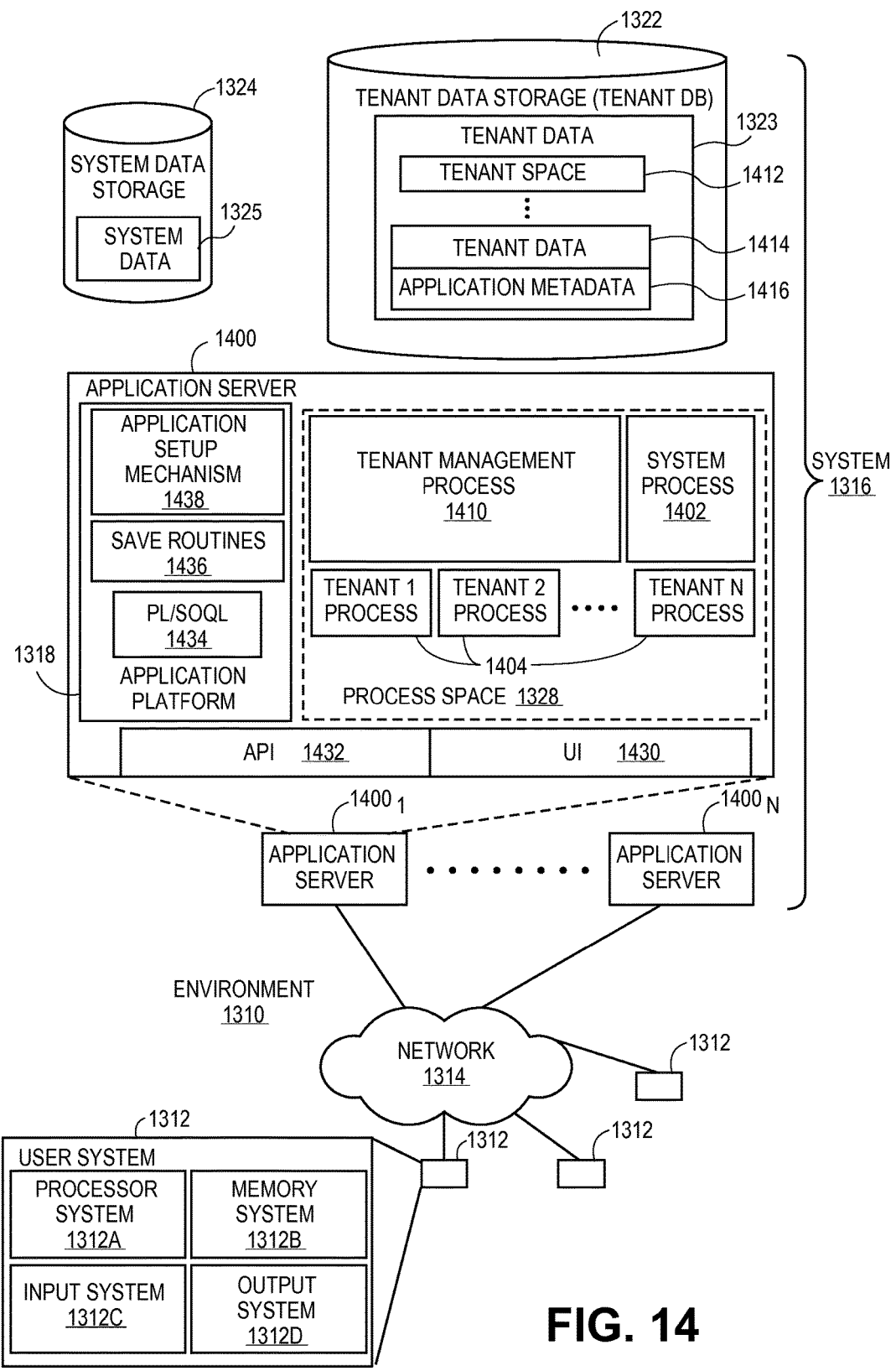
FIG. 14 illustrates a block diagram of an embodiment of elements of a system and various possible interconnections between these elements.

FIG. 14 illustrates a block diagram of an embodiment of elements of FIG. 13 and various possible interconnections between these elements. FIG. 14 also illustrates environment 1310. However, in FIG. 14, the elements of system 1316 and various interconnections in an embodiment are further illustrated. FIG. 14 shows that user system 1312 may include a processor system 1312A, memory system 1312B, input system 1312C, and output system 1312D. FIG. 14 shows network 1314 and system 1316. FIG. 14 also shows that system 1316 may include tenant data storage 1322, tenant data 1323, system data storage 1324, system data 1325, User Interface (UI) 1430, Application Program Interface (API) 1432, PL/SOQL 1434 as well as PreQL, save routines 1436, application setup mechanism 1438, applications servers 1400₁-1400N, system process space 1402, tenant process spaces 1404, tenant management process space 1410, tenant storage area 1412, user storage 1414, and application metadata 1416. In other embodiments, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1323 therein, and system data storage 1324 and the system data 1325 therein to serve requests of user systems 1312. The tenant data 1323 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as one or more Oracle™ databases.

Application platform 1318 includes an application setup mechanism 1438 that supports application developers' creation and management of applications, which may be saved as metadata into tenant data storage 1322 by save routines 1436 for execution by subscribers as one or more tenant process spaces 1404 managed by tenant management process space 1410 for example. Invocations to such applications may be coded using PL/SOQL 1434 as well as PreQL that provides a programming language style interface extension to API 1432. Invocations to applications may be detected by one or more system processes, which manage retrieving application metadata 1416 for the subscriber making the invocation and executing the metadata as an application in a virtual machine.

Each application server 1400 may be communicably coupled to database systems, e.g., having access to system data 1325 and tenant data 1323, via a different network connection. For example, one application server 1400₁ might be coupled via the network 1314 (e.g., the Internet), another application server 1400N-1 might be coupled via a direct network link, and another application server 1400N might be coupled by yet a different network connection. Transfer Control Protocol and Internet Protocol (TCP/IP) are typical protocols for communicating between application servers 1400 and the database system. However, it will be apparent to one skilled in the art that other transport protocols may be used to optimize the system depending on the network interconnect used.

In certain embodiments, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In one embodiment, therefore, an interface system implementing a load balancing function (e.g., an F5 Big-IP load balancer) is communicably coupled between the application servers 1400 and the user systems 1312 to distribute requests to the application servers 1400. In one embodiment, the load balancer uses a least connections algorithm to route user requests to the application servers 1400. Other examples of load balancing algorithms, such as round robin and observed response time, also can be used. For example, in certain embodiments, three consecutive requests from the same user may hit three different application servers 1400, and three requests from different users may hit the same application server 1400. In this manner, system 1316 is multi-tenant, in which system 1316 handles storage of, and access to, different objects, data and applications across disparate users and organizations.

As an example of storage, one tenant might be a company that employs a sales force where each salesperson uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more structure query statements (e.g., one or more SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 15A:
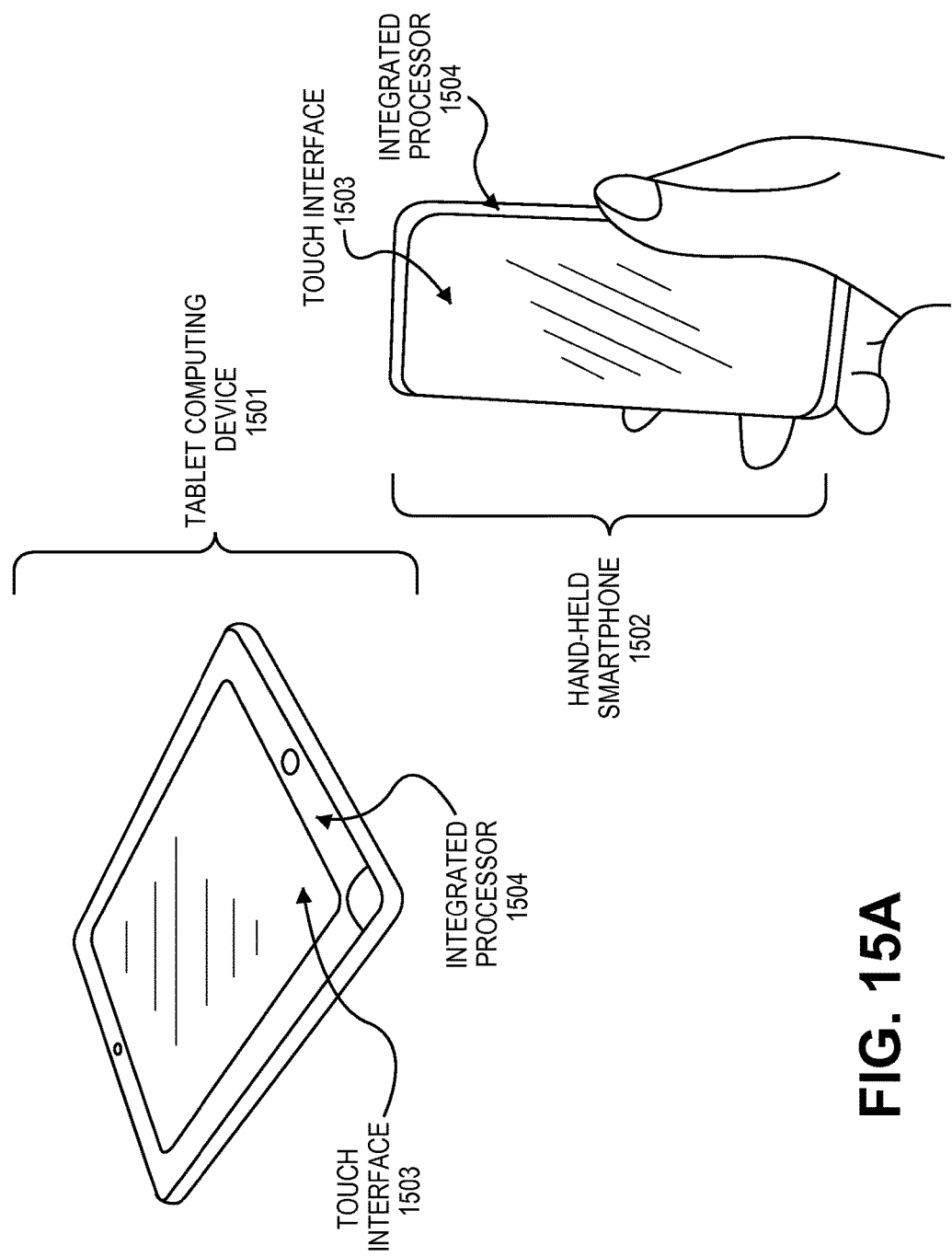
FIG. 15A depicts a tablet computing device and a hand-held smartphone having a circuitry integrated therein in accordance with the embodiments.

FIG. 15A depicts a tablet computing device 1501 and a hand-held smartphone 1502 each having a circuitry integrated therein as described in accordance with the embodiments. As depicted, each of the tablet computing device 1501 and the hand-held smartphone 1502 include a touchscreen interface 1503 and an integrated processor 1504 in accordance with disclosed embodiments.

For example, in one embodiment, a system embodies a tablet computing device 1501 or a hand-held smartphone 1502, in which a display unit of the system includes a touchscreen interface 1503 for the tablet or the smartphone and further in which memory and an integrated circuit operating as an integrated processor are incorporated into the tablet or smartphone, in which the integrated processor implements one or more of the embodiments described herein for use of a predictive and latent structure query implementation through an on-demand and/or multi-tenant database system such as a cloud computing service provided via a public Internet as a subscription service. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Although the tablet computing device 1501 and hand-held smartphone 1502 may have limited processing capabilities, each is nevertheless enabled to utilize the predictive and latent structure query capabilities provided by a host organization as a cloud based service, for instance, such as host organization 1110 depicted at FIG. 11.

Figure 15B:
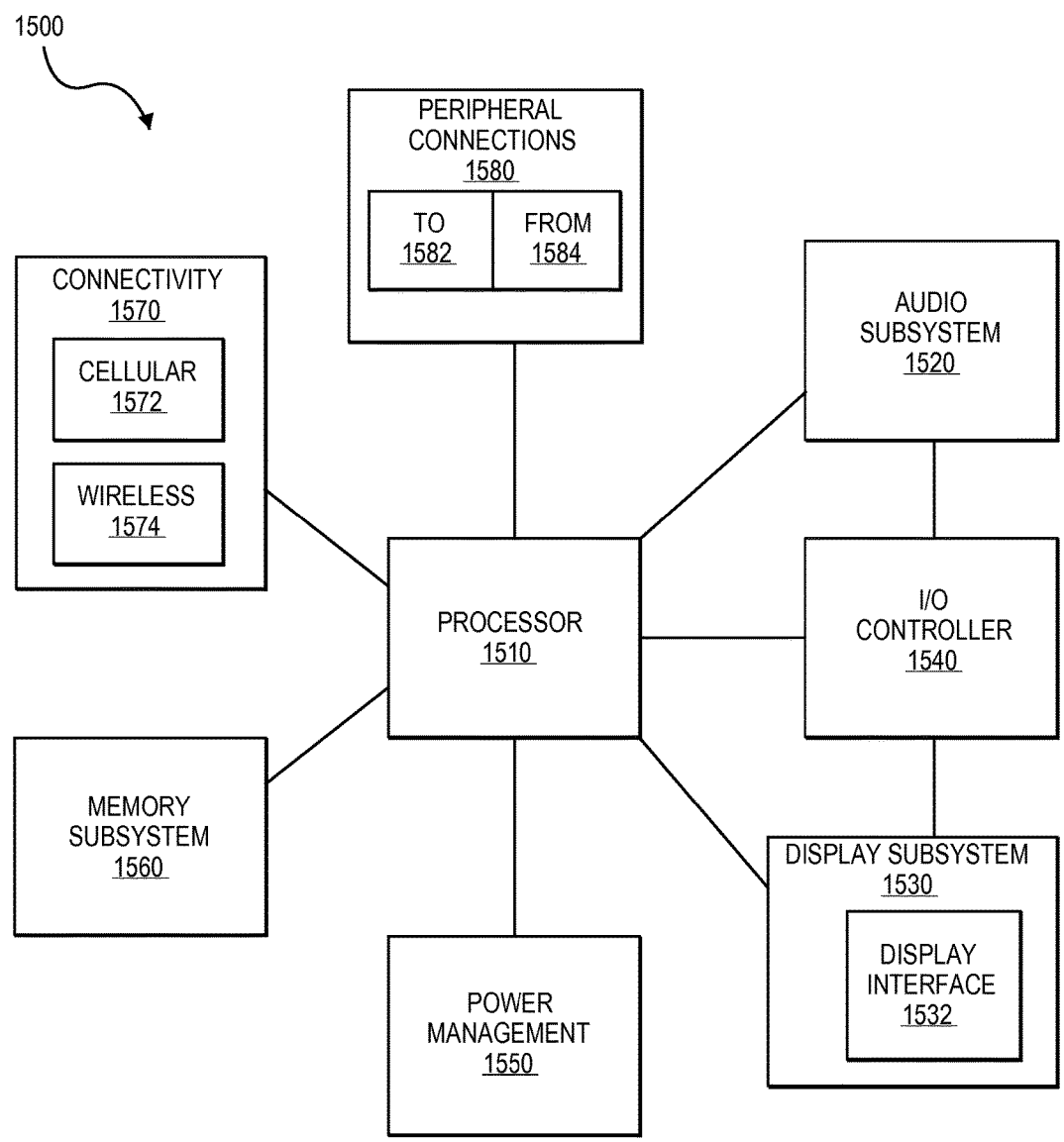
FIG. 15B depicts a tablet computing device, a hand-held smartphone, or other mobile device in which touchscreen interface connectors are used.

FIG. 15B is a block diagram 1500 of an embodiment of tablet computing device 1501, hand-held smartphone 1502, or other mobile device in which touchscreen interface connectors are used. Processor 1510 performs the primary processing operations. Audio subsystem 1520 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1510.

Display subsystem 1530 represents hardware (e.g., display devices) and software (e.g., drivers) components that provide a visual and/or tactile display for a user to interact with the tablet computing device or smart phone. Display subsystem 1530 includes display interface 1532, which includes the particular screen or hardware device used to provide a display to a user. In one embodiment, display subsystem 1530 includes a touchscreen device that provides both output and input to a user.

I/O controller 1540 represents hardware devices and software components related to interaction with a user. I/O controller 1540 can operate to manage hardware that is part of audio subsystem 1520 and/or display subsystem 1530. Additionally, I/O controller 1540 illustrates a connection point for additional devices that connect to the tablet computing device or smart phone through which a user might interact. In one embodiment, I/O controller 1540 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1550 that manages battery power usage, charging of the battery, and features related to power saving operation. Memory subsystem 1560 includes memory devices for storing information in the tablet computing device or smart phone. Connectivity 1570 includes hardware devices (e.g., wireless and/or wired connectors and communication hardware) and software components (e.g., drivers, protocol stacks) to the tablet computing device or smart phone to communicate with external devices. Cellular connectivity 1572 may include, for example, wireless carriers such as GSM (global system for mobile communications), CDMA (code division multiple access), TDM (time division multiplexing), or other cellular service standards). Wireless connectivity 1574 may include, for example, activity that is not cellular, such as personal area networks (e.g., Bluetooth), local area networks (e.g., WiFi), and/or wide area networks (e.g., WiMax), or other wireless communication.

Peripheral connections 1580 include hardware interfaces and connectors, as well as software components (e.g., drivers, protocol stacks) to make peripheral connections as a peripheral device ("to" 1582) to other computing devices, as well as have peripheral devices ("from" 1584) connected to the tablet computing device or smart phone, including, for example, a "docking" connector to connect with other computing devices. Peripheral connections 1580 include common or standards-based connectors, such as a Universal Serial Bus (USB) connector, DisplayPort including MiniDisplayPort (MDP), High Definition Multimedia Interface (HDMI), Firewire, etc.

Figure 16:
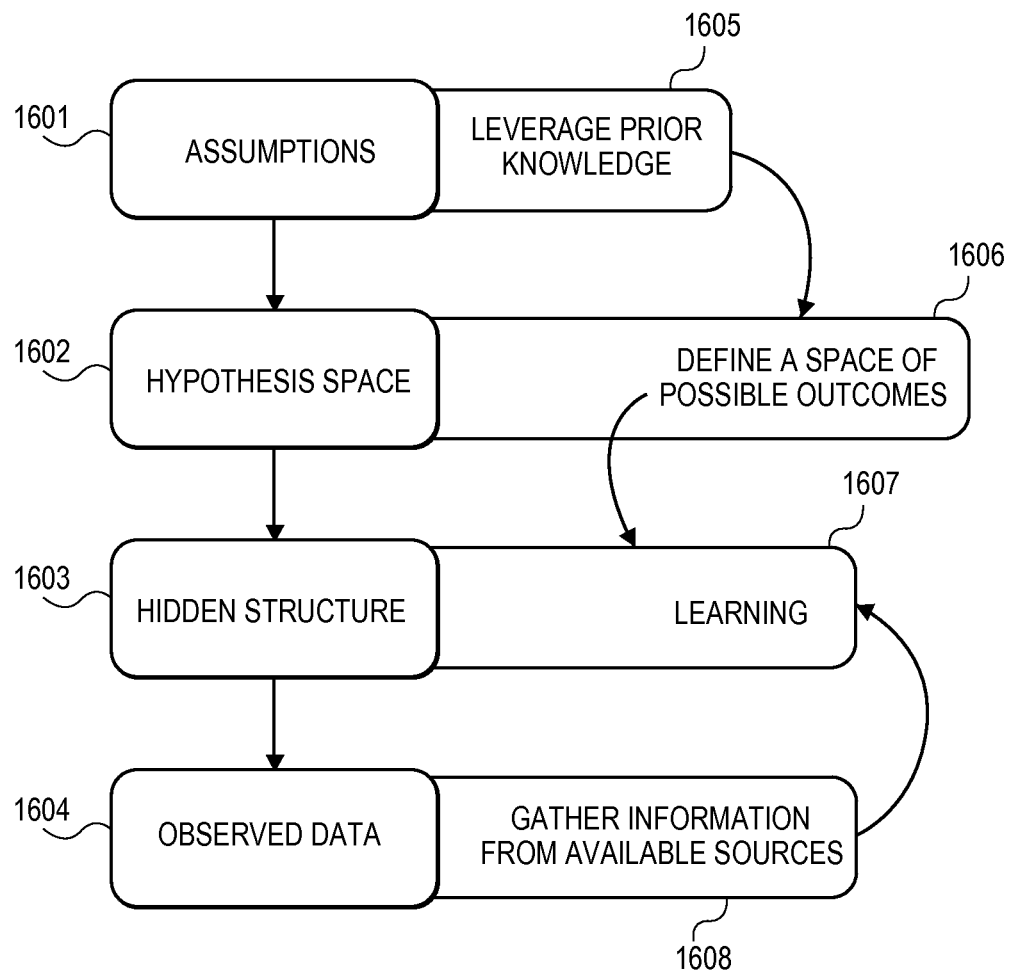
FIG. 16 depicts a simplified flow for probabilistic modeling that may be applied according to an embodiment.

FIG. 16 depicts a simplified flow for probabilistic modeling that may be applied according to an embodiment. Probabilistic modeling requires a series of choices and assumptions. For instance, it is possible to trade off fidelity and detail with tractability. Assumptions define an outcome space, which may be considered hypotheses, and in the modeling view, one of these possible hypotheses actually occurs.

For instance, at element 1601 the probabilistic modeling flow depicts assumptions that leverage prior knowledge 1605. The flow advances to element 1602 where there is a hypothesis space that defines a space of possible outcomes 1606. The probabilistic modeling flow advances to element 1603, which results in hidden structure based on learning 1607 derived from the defined space of possible outcomes 1606. The flow then advances to element 1604 where observed data is utilized by gathering information from available sources 1608 which then loops back to learning at element 1607 to recursively better inform the probabilistic model.

The hidden structure at 1603 is used to generate data. The hidden structure 1603 and the resulting generated data may be considered the generative view. Learning 1607 uses available sources of information and inferences about the hidden structure which may include certain modeling assumptions ("prior"), as well as data observed ("likelihood"), from which a combination of prior and likelihood may be utilized to draw conclusions ("posterior").

Such assumptions yield hypothesis space and additionally provide a means by which probabilities may be assigned to such assumptions, thus yielding a probability distribution on hypotheses, given actual data observed.

The modeling assumptions implemented by the analysis engine to generate queryable indices define both a hypothesis space as well as a recipe for assigning a probability to each hypothesis given some data. A probability distribution thus results in which each hypothesis is an outcome, for which there can be a great many available and possible outcomes, each with varying probability. There can also be a great many hypotheses and finding the best ones to explain the data is not a straightforward or obvious proposition.

Probabilistic inference thus presents the problem of how to search through the available hypothesis space to find the ones that give the best explanations for the data at hand. The analysis engine described herein implements a range of methods including functionality to solve the math directly, functionality to leverage optimization to find the peak of the hypothesis space, and functionality to implement random walks through the hypothesis space.

The probabilistic modeling makes assumptions 1601 and using the assumptions, a hypothesis space 1602 is defined. Probabilities are assigned to the hypotheses given data observed and then inference is used to figure out which of those explanatory hypotheses are plausible and which one is the best.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The examples illustrating the use of technology disclosed herein should not be taken as limiting or preferred. These examples are intended to sufficiently illustrate the technology disclosed without being overly complicated. These examples are not intended to illustrate all of the technologies disclosed.

One or more implementations may be implemented in numerous ways, including as a process, an apparatus, a system, a device, a method, a computer readable medium such as a non-transitory computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions that are stored in the memory, to perform a method as described above.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method performed by a database system having at least a processor and a memory therein, wherein the method comprises:
   displaying to an agent's display screen interface, data entered into a plurality of data fields initiating a service request of a first case for a first client, wherein the data is received from the agent regarding the first case and entered into the database system via the agent's display screen interface;
   wherein the data received for the plurality of data fields includes at least a subset of the plurality of data fields received as blank entries;
   returning results of a predictive query against the database system to the agent's display screen interface to complete one or more of the plurality of data fields received as blank entries with predicted values to form a case report more complete than the data entered into the plurality of data fields regarding the first case from the first client or the agent;
   comparing, via the database system, the first case with other cases stored within the database system;
   identifying, via the database system, one or more similar cases to the first case based on the comparison and displaying the one or more similar cases identified to a related cases interface at the agent's display screen interface;
   generating, via a predictive intelligence algorithm applied by the database system, one or more predictive actions for the first case based on the identified one or more similar cases, wherein the one or more predictive actions comprises at least making a determination of severity for a problem defined by the case report;
   calculating a confidence value for the one or more predictive actions; and
   executing a routing rules module via the processor and memory of the database system causing the first case to be routed past one or more lower tiers of service via a pre-escalation procedure based on the determination of severity for the problem and the confidence value for the determination of severity for the problem exceeding a threshold.

2. The method of claim 1, wherein comparing the case report with other cases comprises comparing the content of the case report with earlier cases; and
   wherein the comparing includes at least analyzing case object fields and case child object fields of the case report and the earlier cases and extracting keywords from one or more of subject, description, and other text fields of the case report and the earlier cases.

3. The method of claim 1, wherein generating the one or more predictive action includes applying a confidence factor representing a level of confidence in a prediction.

4. The method of claim 1:
   wherein service request data is received in connection with the service request from the first client and wherein the service request data is displayed to the agent via the agent's display screen interface; and
   wherein the one or more similar cases include one or more resolved cases, one or more on-going cases, or both.

5. The method of claim 1, wherein performing a predictive query against the database system to complete one or more of the plurality of data fields received as blank entries with predicted values comprises predicting category and application area fields based on a free text description of the first case from an email channel associated with the first case.

6. The method of claim 1, wherein the one or more predictive actions include replacement of data for one or more data fields that are determined to be erroneous.

7. The method of claim 1, wherein the one or more predictive actions include one or more of:
   the determination of the severity of the problem for the first case, and pre-escalation of service for the first case based on the severity of the problem for the first case and based further on a SLA (Service Level Agreement) violation risk; and
   wherein the pre-escalation completely bypasses the one or more lower tiers of service when the predictive intelligence algorithm calculates the confidence value for the one or more predictive actions in excess of the threshold indicating that the one or more lower tiers of service will be wasted.

8. The method of claim 1, wherein the predictive action includes one or more of:
   recommendation of questions to be directed to the first client;
   routing of the case;
   recommendation of a solution based on a solution for one or more similar cases; and
   identification of one or more experts for the first case.

9. A database system comprising:
   a processor and a memory to execute instructions;
   an agent's display screen interface to execute via the processor and the memory of the database system, wherein the agent's display screen interface is to display data entered into a plurality of data fields initiating a service request of a first case for a first client, wherein the data is received from the agent regarding the first case and entered into the database system via the agent's display screen interface;
   wherein the data received for the plurality of data fields includes at least a subset of the plurality of data fields received as blank entries;
   a query interface to return results of a predictive query against the database system to the agent's display screen interface to complete one or more of the plurality of data fields received as blank entries with predicted values to form a case report more complete than the data entered into the plurality of data fields regarding the first case from the first client or the agent;
   an analysis engine to compare the first case with other cases stored within the database system;
   wherein the analysis engine is to further identify one or more similar cases to the first case based on the comparison and displaying the one or more similar cases identified to a related cases interface at the agent's display screen interface;
   a predictive intelligence engine to generate via a predictive intelligence algorithm applied by the database system, one or more predictive actions for the first case based on the identified one or more similar cases, wherein the one or more predictive actions comprises at least making a determination of severity for a problem defined by the case report;

wherein the predictive intelligence engine is to further calculate a confidence value for the one or more predictive actions; and a routing rules module to execute via the processor and memory of the database system, wherein execution of the routing rules module causes the first case to be routed past one or more lower tiers of service via a pre-escalation procedure based on the determination of severity for the problem and the confidence value for the determination of severity for the problem exceeding a threshold.

10. The database system of claim 9, wherein comparing the case report with other cases comprises comparing the content of the case report with earlier cases; and wherein the comparing includes at least analyzing case object fields and case child object fields of the case report and the earlier cases and extracting keywords from one or more of subject, description, and other text fields of the case report and the earlier cases.

11. The database system of claim 9, wherein the interface is to receive the data regarding the first case in connection with the service request from the first client received by the agent.

12. The database system of claim 9:

wherein the database system is a multi-tenant database system; and wherein the received data is entered in a local computing apparatus, the local computer apparatus being linked to the multi-tenant database system by a network connection.

13. The database system of claim 9, wherein generating the one or more predictive actions includes applying a confidence factor representing a level of confidence in a prediction.

14. Non-transitory computer-readable storage media having instructions stored thereupon that, when executed by a processor of a database system, the instructions cause the database system to perform operations including:

displaying to an agent's display screen interface, data entered into a plurality of data fields initiating a service request of a first case for a first client, wherein the data is received from the agent regarding the first case and entered into the database system via the agent's display screen interface;

wherein the data received for the plurality of data fields includes at least a subset of the plurality of data fields received as blank entries;

returning results of a predictive query against the database system to the agent's display screen interface to complete one or more of the plurality of data fields received as blank entries with predicted values to form a case report more complete than the data entered into the plurality of data fields regarding the first case from the first client or the agent;

comparing, via the database system, the first case with other cases stored within the database system;

identifying, via the database system, one or more similar cases to the first case based on the comparison and displaying the one or more similar cases identified to a related cases interface at the agent's display screen interface;

generating, via a predictive intelligence algorithm applied by the database system, one or more predictive actions for the first case based on the identified one or more similar cases, wherein the one or more predictive actions comprises at least making a determination of severity for a problem defined by the case report;

calculating a confidence value for the one or more predictive actions; and executing a routing rules module via the processor and memory of the database system causing the first case to be routed past one or more lower tiers of service via a pre-escalation procedure based on the determination of severity for the problem and the confidence value for the determination of severity for the problem exceeding a threshold.

15. The non-transitory computer-readable storage media of claim 14, wherein comparing the case report with other cases comprises comparing the content of the case report with earlier cases; and wherein the comparing includes at least analyzing case object fields and case child object fields of the case report and the earlier cases and extracting keywords from one or more of subject, description, and other text fields of the case report and the earlier cases.

16. The non-transitory computer-readable storage media of claim 14, wherein generating the one or more predictive action includes applying a confidence factor representing a level of confidence in a prediction.

17. The non-transitory computer-readable storage media of claim 14:

wherein service request data is received in connection with the service request from the first client and wherein the service request data is displayed to the agent via the agent's display screen interface; and wherein the one or more similar cases include one or more resolved cases, one or more on-going cases, or both.

18. The non-transitory computer-readable storage media of claim 14, wherein the one or more predictive actions includes one or more of pre-population of one or more data fields for the first case, and completion of one or more data fields for the first case that are left blank.

19. The non-transitory computer-readable storage media of claim 14, wherein the one or more predictive actions include replacement of data for one or more data fields that are determined to be erroneous.

20. The non-transitory computer-readable storage media of claim 14, wherein the one or more predictive actions include one or more of:

the determination of the severity of the problem for the first case, and pre-escalation of service for the first case based on the severity of the problem for the first case and based further on a SLA (Service Level Agreement) violation risk; and wherein the pre-escalation completely bypasses the one or more lower tiers of service when the predictive intelligence algorithm calculates the confidence value for the one or more predictive actions in excess of the threshold indicating that the one or more lower tiers of service will be wasted.

21. The non-transitory computer-readable storage media of claim 14, wherein the predictive action includes one or more of:

recommendation of questions to be directed to the first client;

routing of the case;

recommendation of a solution based on a solution for one or more similar cases; and identification of one or more experts for the first case.

* * * * *